United States Patent
Gopalakrishnan et al.

(10) Patent No.: US 9,843,923 B2
(45) Date of Patent: Dec. 12, 2017

(54) ADAPTIVE GROUP PAGING FOR A COMMUNICATION NETWORK

(71) Applicant: AT&T INTELLECTUAL PROPERTY I, L.P., Atlanta, GA (US)

(72) Inventors: Vijay Gopalakrishnan, Edison, NJ (US); Seungjoon Lee, Basking Ridge, NJ (US); Jacobus Erasmus Van der Merwe, Salt Lake City, UT (US); Arijit Banerjee, Salt Lake City, UT (US); Sneha Kumar Kasera, Salt Lake City, UT (US)

(73) Assignees: AT&T INTELLECTUAL PROPERTY I, L.P., Atlanta, GA (US); UNIVERSITY OF UTAH, Salt Lake City, UT (US)

( * ) Notice: Subject to any disclaimer, the term of this patent is extended or adjusted under 35 U.S.C. 154(b) by 169 days.

(21) Appl. No.: 14/794,583

(22) Filed: Jul. 8, 2015

(65) Prior Publication Data
US 2017/0013443 A1    Jan. 12, 2017

(51) Int. Cl.
| H04H 20/71 | (2008.01) |
| H04W 8/18 | (2009.01) |
| H04W 68/02 | (2009.01) |
| H04L 12/26 | (2006.01) |
| H04W 76/04 | (2009.01) |

(52) U.S. Cl.
CPC ......... *H04W 8/186* (2013.01); *H04L 43/0876* (2013.01); *H04W 68/02* (2013.01); *H04W 76/046* (2013.01)

(58) Field of Classification Search
None
See application file for complete search history.

(56) References Cited

U.S. PATENT DOCUMENTS

| 8,462,722 B2 | 6/2013 | Diachina et al. |
| 8,549,287 B2 | 10/2013 | Sarkkinen et al. |

(Continued)

FOREIGN PATENT DOCUMENTS

| GB | 2489690 A | 10/2012 |
| WO | 2011100540 A1 | 8/2011 |

(Continued)

OTHER PUBLICATIONS

Aslewaidi, et al. "Performance comparison of LTE-A RAN operating in 800MHz and 2.4 GHz bands for M2M communications." Wireless Communications Systems (ISWCS), 2014 11th International Symposium on. IEEE, 2014.

(Continued)

*Primary Examiner* — Otis L Thompson, Jr.
(74) *Attorney, Agent, or Firm* — Amin, Turocy & Watson, LLP

(57) ABSTRACT

When traffic arrives from the network for an idle mobile device, the network executes device activation procedures to awaken the device, which can result in a significant amount of signaling to complete. Adaptive device activation mechanisms are provided that adapt to network conditions and potentially to machine-to-machine device application requests to realize scalable device activation without increasing the resources used for this purpose and without negatively impacting existing human-to-human or human-to-machine traffic.

20 Claims, 15 Drawing Sheets

(56) References Cited

U.S. PATENT DOCUMENTS

| | | |
|---|---|---|
| 8,565,794 B2 | 10/2013 | Lee et al. |
| 8,593,956 B2 | 11/2013 | Tiwari |
| 8,620,336 B2 | 12/2013 | Golaup et al. |
| 8,751,848 B2 | 6/2014 | Colban et al. |
| 8,774,211 B2 | 7/2014 | Kotecha et al. |
| 8,797,987 B2 | 8/2014 | Li et al. |
| 8,797,989 B2 | 8/2014 | Lee |
| 8,837,443 B2 | 9/2014 | Yamada et al. |
| 8,867,562 B2 | 10/2014 | Lee |
| 8,885,458 B2 | 11/2014 | Diachina et al. |
| 8,891,423 B2 | 11/2014 | Shaheen et al. |
| 8,902,742 B2 | 12/2014 | Viorel et al. |
| 8,929,306 B2 | 1/2015 | Lee et al. |
| 8,995,336 B2 | 3/2015 | Diachina et al. |
| 9,560,492 B2 * | 1/2017 | Li ........................... H04W 4/08 |
| 2006/0251033 A1 * | 11/2006 | Oprescu-Surcobe . H04W 68/02 370/338 |
| 2008/0102789 A1 * | 5/2008 | Sung ........................ H04L 12/66 455/406 |
| 2010/0167756 A1 * | 7/2010 | Park ........................ H04W 4/12 455/456.1 |
| 2011/0201307 A1 | 8/2011 | Segura |
| 2011/0223942 A1 * | 9/2011 | Xu ........................ H04W 68/02 455/458 |
| 2011/0244907 A1 * | 10/2011 | Golaup ................. H04W 4/005 455/509 |
| 2011/0274040 A1 | 11/2011 | Pani et al. |
| 2012/0033613 A1 | 2/2012 | Lin et al. |
| 2012/0076085 A1 | 3/2012 | Chou |
| 2012/0196608 A1 | 8/2012 | Ting et al. |
| 2012/0254890 A1 | 10/2012 | Li et al. |
| 2013/0015953 A1 * | 1/2013 | Hsu ........................ H04W 4/005 340/7.46 |
| 2013/0028224 A1 | 1/2013 | Chen et al. |
| 2013/0039317 A1 | 2/2013 | Jamadagni et al. |
| 2013/0208647 A1 | 8/2013 | Kottkamp et al. |
| 2013/0208694 A1 | 8/2013 | Park et al. |
| 2013/0343256 A1 | 12/2013 | Zakrzewski |
| 2014/0064111 A1 | 3/2014 | Viorel et al. |
| 2014/0079011 A1 | 3/2014 | Wiberg et al. |
| 2014/0177525 A1 | 6/2014 | Aydin et al. |
| 2014/0328258 A1 | 11/2014 | Cheng et al. |
| 2016/0211986 A1 * | 7/2016 | Diachina ............. H04L 12/4035 |
| 2016/0330790 A1 * | 11/2016 | Chen ................. H04W 52/0216 |

FOREIGN PATENT DOCUMENTS

| | | |
|---|---|---|
| WO | 2011120443 A1 | 10/2011 |
| WO | 2012031389 A1 | 3/2012 |
| WO | 2012065487 A1 | 5/2012 |
| WO | 2013169057 A1 | 11/2013 |
| WO | 2015015136 A1 | 2/2015 |

OTHER PUBLICATIONS

Banerjee, et al. "Efficient, Adaptive and Scalable Device Activation for M2M Communications." http://www.cs.utah.edu/~arijit/pubs/secon15.pdf Last accessed Oct. 7, 2015.

Duan, et al. "Dynamic access class barring for M2M communications in LTE networks." Global Communications Conference (GLOBECOM), 2013 IEEE. IEEE, 2013.

Ferdouse, et al. "Congestion and overload control techniques in massive M2M systems: a survey." Transactions on Emerging Telecommunications Technologies (2015).

Gerasimenko, et al. "Impact of machine—type communications on energy and delay performance of random access channel in LTE—advanced." Transactions on Emerging Telecommunications Technologies 24.4 (2013): 366-377.

Giluka, et al. "Adaptive RACH congestion management to support M2M communication in 4G LTE networks." Advanced Networks and Telecommunications Systems (ANTS), 2013 IEEE International Conference on. IEEE, 2013.

Kouzayha, et al. "Towards a better support of Machine Type Communication in LTE-networks: Analysis of random access mechanisms." Advances in Biomedical Engineering (ICABME), 2013 2nd International Conference on. IEEE, 2013.

Madueno, et al. "Massive M2M Access with Reliability Guarantees in LTE Systems." arXiv preprint arXiv:1502.02850 (2015).

Tavana, et al. "Congestion Control for Bursty M2M Traffic in LTE Networks." http://www.ece.ubc.ca/~vincentw/C/TSMW-ICC-15.pdf. Last accessed Oct. 7, 2015.

Wu, et al. "Fast adaptive S-ALOHA scheme for event-driven machine-to-machine communications." Vehicular Technology Conference (VTC Fall), 2012 IEEE. IEEE, 2012.

Yang, et al. "M2M access performance in LTE—A system." Transactions on Emerging Telecommunications Technologies 25.1 (2014): 3-10.

* cited by examiner

US 9,843,923 B2

ADAPTIVE GROUP PAGING FOR A COMMUNICATION NETWORK

TECHNICAL FIELD

The present application relates generally to providing adaptive group sizes, group membership, and/or backoff parameters to enable efficient and scalable techniques for paging devices of a communication network.

BACKGROUND

Mobile devices and other user equipment that are not actively sending or receiving data traffic enter an idle state after a brief period of inactivity. When traffic arrives from the network for the user equipment device, the network executes device activation procedures to wake the device up. Device activation procedures represent a significant portion of all communication network signaling.

The number of subscriber devices that connect to wireless networks has been growing at a very fast pace for many years. In the past, consumer purchase of manually-operated devices such as smart phones, tablets, etc. has driven the majority of the growth. However, a recent trend has started to emerge in which a different class of device is beginning to drive a significant proportion of the growth of subscriber devices that utilize wireless network services. Machine-to-machine devices such as smart meters, smart appliances, sensors, or the like, are not manually operated by a user when connecting to the network and communicating data but are increasingly becoming subscribers of wireless networks. It is expected that in the coming years M2M devices that use wireless network services will grow to the billions, possibly many hundreds of billions, which can place unsustainable stress on communication networks, specifically with regard to device activation signaling.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
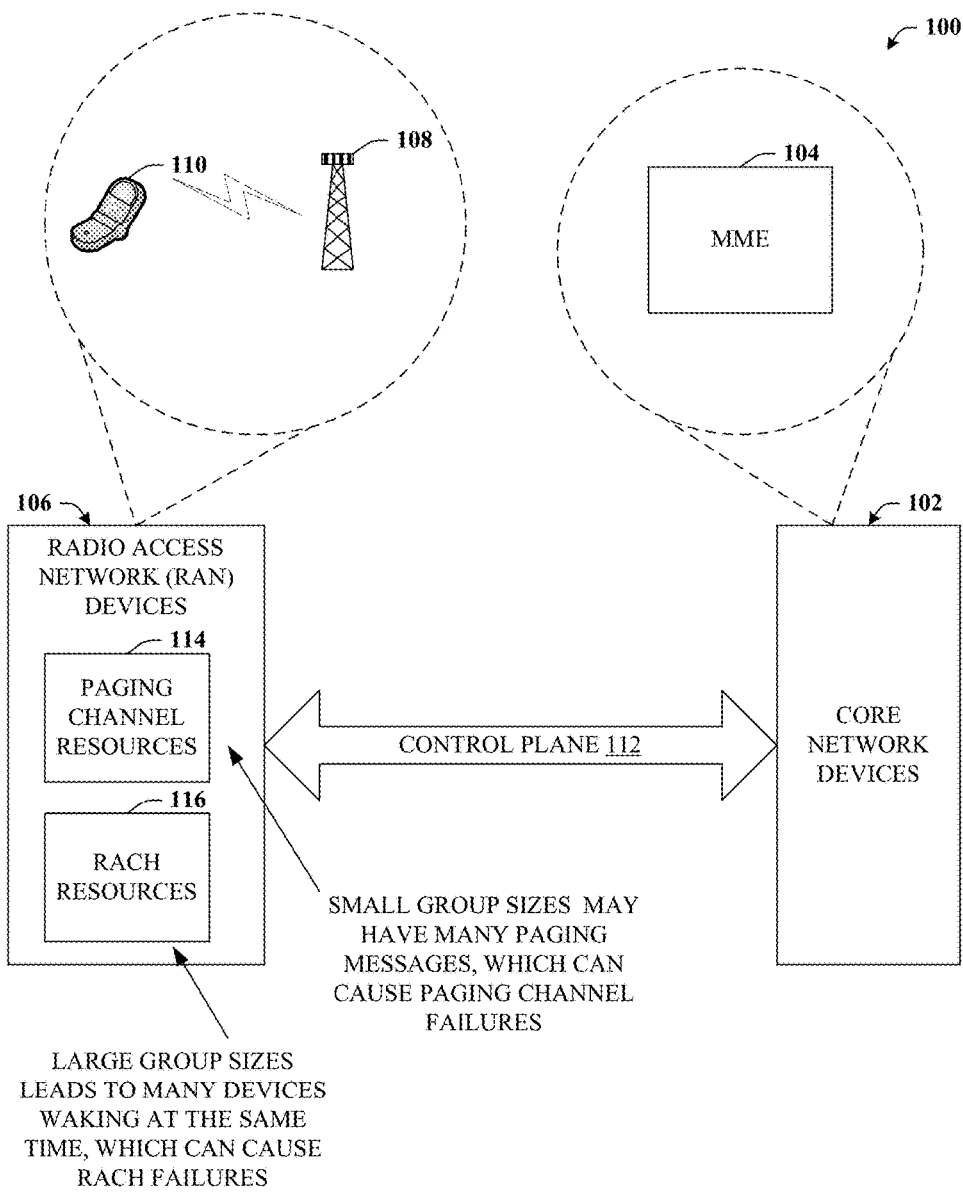
FIG. 1 illustrates a block diagram of an example communication network that is depicted illustrating certain issues associated with group paging in order to contemporaneously wake the group of devices from an idle state in accordance with certain embodiments of this disclosure.

To preserve network resources and energy, user equipment (UE) devices that are not actively communicating enter an idle state after a short period of inactivity. When devices enter this idle state, network state data associated with the device, specifically across the radio access network (RAN), is released. Device activation then refers to the mechanisms involved in "waking the device up" from this idle state and restoring the network state used to enable the device to communicate.

Device activation by itself is not a new concept but has been part-and-parcel of cellular networks since their inception, and amounts to almost 30% of the total signaling traffic in many current communication network deployments. Current device activation mechanisms were developed to support a single service, namely human-to-human (H2H) voice communication. Growth of data traffic from smart phone use caused this initial use to be replaced by the current predominant human-to-machine (H2M) communication as users use their cellular devices to access Internet services. Future growth is expected to be predominantly machine-to-machine (M2M) communication, where smart devices function without direct human mediation, and M2M communication is rapidly becoming commonplace. The scale and unique communication requests or requirements of M2M pose new challenges to wide area wireless communication infrastructure like cellular networks that have been engineered and optimized for human initiated communication. The expected growth of M2M communication in future cellular networks, however, suggests that existing device activation mechanisms will be inadequate.

The device activation workloads associated with H2H and H2M communication patterns are different from the workload that might be expected in an M2M environment. For example, a server contacting thousands of smart meters every hour on the hour will present a radically different step function in terms of offered load to the device activation mechanisms. More importantly, M2M communication is expected to dominate cellular network communication presenting a scalability problem that current mechanisms are simply not able to cope with. A recent M2M study suggests that the percentage of connected M2M devices will grow from 23% in 2012 to 61% in 2022 and that the number of M2M connections is expected to grow at an annual rate of 22% from 2 billion in 2012 to 18 billion in 2022. These numbers suggest that the onslaught of M2M devices and traffic are poised to overwhelm existing cellular network mechanisms, thereby negatively impacting the experience of mobile users at a time when the importance of cellular networks continues its unabated growth.

Given that current device activation mechanisms are ill suited to support the expected growth of M2M devices and traffic, the disclosed subject matter can mitigate various device activation issues, whether in connection with M2M growth or current conditions. In this regard, proposed is an adaptive device activation architecture for communication networks (e.g., LTE/EPC cellular networks) that adapts to network conditions and M2M or other application requests or requirements in order to realize scalable device activation without increasing the resources used for this purpose. This adaptive approach can enable the network to handle M2M applications with a large number of devices without negatively impacting existing human-to-human (H2H) and human-to-machine (H2M) traffic.

Adaptive paging mechanisms (e.g., to facilitate device activation) disclosed herein can rely on fundamental group paging mechanisms that are supported by third generation partnership project (3GPP) standards as well as other standards bodies. Hence, paging messages that are delivered to a device to wake that device from an idle state can be configured to wake an entire group of devices with a single paging message. Group paging therefore reduces signaling with respect to some network resources (e.g., a paging channel) since waking up devices as a group requests or requires fewer paging messages. On the other hand, since the entire group wakes and attempts to attach to the network at substantially the same time, group paging can also stress other network resources (e.g., a random access channel). The disclosed adaptive paging mechanisms are directed to optimizing and/or balancing the trade-offs associated with group paging that exist due to fixed resources.

The adaptive paging mechanisms disclosed herein are directed to three primary focus areas: mechanisms to adaptively determine an optimal or advantageous group size, mechanisms to adaptively determine group membership, and mechanisms to adaptively delay random access channel (RACH) procedures that attempt to attach the device to the network (e.g., wake the device from an idle state) in order to avoid RACH collisions while minimizing or reducing RACH procedure completion times.

Example Adaptive Group Mechanisms

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

Referring now to the drawing, with reference initially to FIG. 1, communication network 100 is depicted illustrating certain issues associated with group paging in order to wake the group of devices from an idle state. In some embodiments, communication network 100 can be a long-term evolution (LTE) and/or evolved packet core (EPC) cellular network. Network 100 can include various core network devices 102 such as, for example, mobility management entity (MME) 104 as well as various other core network devices not shown here.

Mobility management entities (e.g., MME 104) represent a control-node for the LTE access-network. MMEs are responsible for idle mode user equipment (UE) paging and tagging procedure including retransmissions. MMEs are typically involved with bearer activation/deactivation processes and are also generally responsible for choosing a serving gateway for a UE at initial attach and at times of intra-LTE handover involving core network node relocation. MME can also be responsible for authenticating the user (e.g., by interacting with an HSS). Non Access Stratum (NAS) signaling typically terminates at the MME, which can also be responsible for generation and allocation of temporary identities associated with UEs. MMEs also generally provide control plane functionality for mobility between LTE and 2GPP/3GPP access networks via an S3 interface terminating at the MME.

In addition, network 100 can include various radio access network (RAN) devices 106 such as, for instance, access point 108 as well as one or more UE 110. In some embodiments, access point 108 can represent an evolved Node B (eNB), hence access point 108 and eNB 108 can be used herein interchangeably. UE(s) 110 can represent one or more H2H or H2M devices (e.g., cellular phones, smart phones, tablets, etc.) or M2M devices (e.g., smart meters, smart appliances, sensors, embedded automotive devices/sensors, etc.) that attach to access point 108 in order to use services provided by network 100.

Network 100 can include a control plane 112. Control planes (e.g., control plane 112) typically handle routing and priority aspects associated with network traffic and can be distinguished from a data plane (not shown), which handle communication of the data. In other words, the data plane conveys network traffic, whereas the control plane provides various functions relating to how that traffic should be conveyed as well as numerous other control functions. For example, a control plane (e.g., control plane 112) can exists as part of router architecture that is concerned with drawing a network map or managing information and protocols associated with a routing table that defines how to handle incoming packets.

At the RAN portion of the network, control plane 112 resources can include paging channel resources 114 and random access channel (RACH) resources 116, which are typically both constrained by fixed resource allocation. For example, paging channel 114 generally has an upper limit on how many paging messages can be conveyed in a given period. Likewise, RACH 116 generally has an upper limit on how many devices can be awakened and/or activated within a given period. In the context of using group paging, that is, waking up large groups of devices with a single paging message, selecting small group sizes means more paging messages are implicated than with larger group sizes. Given that paging channel 114 resources tend to be fixed, attempting to wake a large number of devices will request or require many paging messages, which in turn can cause an overload condition, a delay in waking up the devices, or another failure condition with respect to paging channel 114.

On the other hand, selecting large group sizes can wake a set of devices with fewer paging messages and thus reduce the load on paging channel 114. However, a resultant trade-off is that because many devices wake and attempt RACH procedures contemporaneously, collisions or other failure conditions are much more likely on RACH 116. Further, a condition may arise in which devices are unnecessarily awakened simply by virtue of being in a group. Thus, selecting a suitable group size can be very advantageous for group device activation. A static group size selection cannot scale or adapt to changing network conditions and is therefore not viewed as a viable solution to paging issues, particularly with regard to the estimated growth of M2M devices that will be placing additional demands on existing infrastructure.

Advantageously, the disclosed subject matter can mitigate the aforementioned issues by adaptively selecting group sizes based on network load, which is further detailed with reference to FIG. 2. In some embodiments, additional benefits can be realized by adaptively selecting group membership, which is also discussed in connection with FIG. 2. Once a suitable group size is selected, the disclosed subject matter can determine suitable backoff parameters based on the selected group size and potentially on other criteria as well. This backoff parameter can represent a period of delay before devices being awakened as a group begin respective RACH procedures to re-establish network connectivity from the idle state. Mechanisms directed to backoff parameters are further detailed with reference to FIG. 3. It is understood that the mechanisms detailed herein can be continually updated based on feedback information. Thus, after a few iterations, both paging channel 114 and RACH 116 can be substantially optimized and continuously adapt to changing network conditions through the processes. It is understood that control plane 112 can include many additional resources not shown here and such resources can be monitored in connection with determining network load data.

Figure 2:
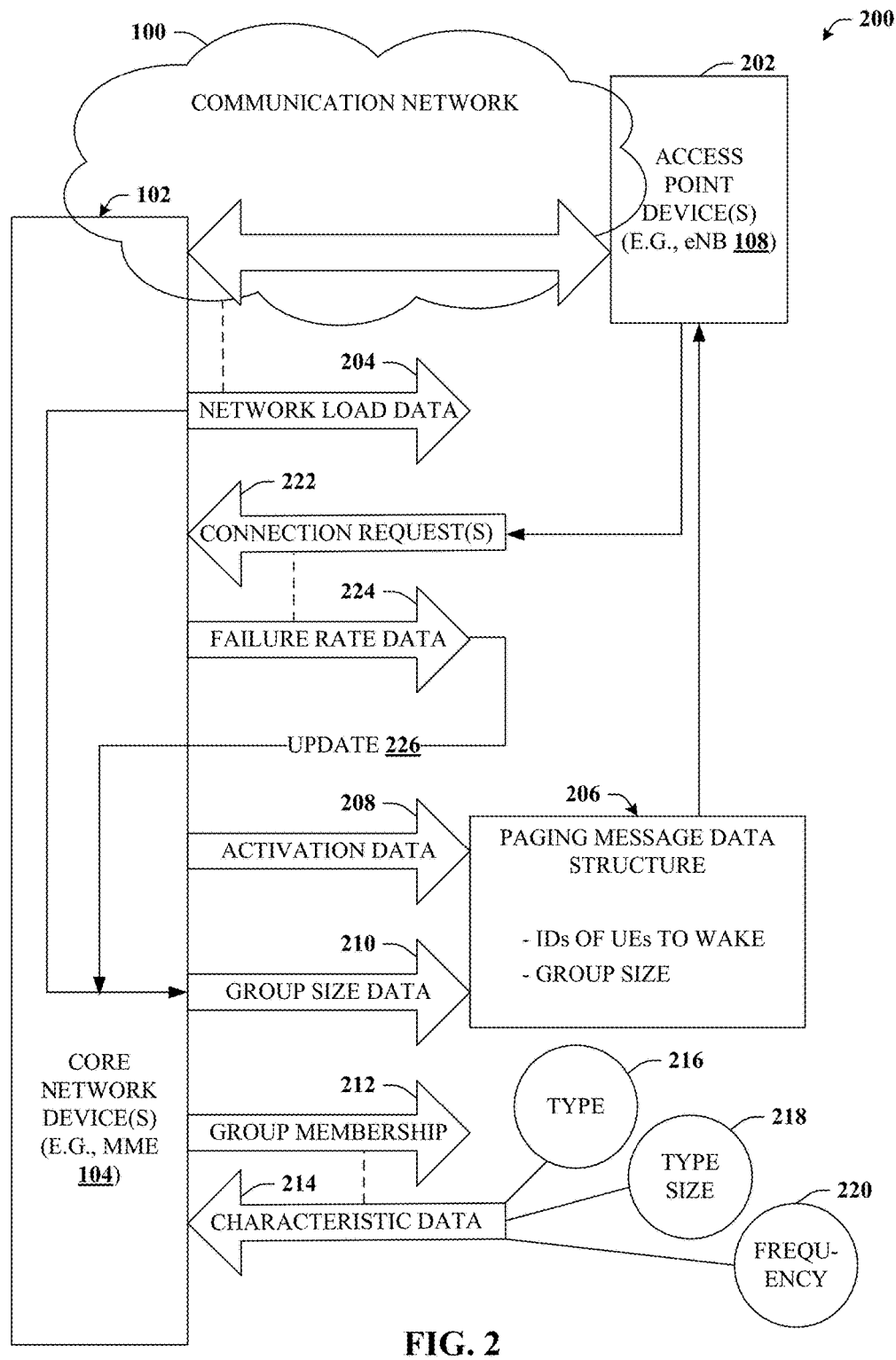
FIG. 2 illustrates a block diagram of an example system that can provide for adaptively selecting group size data and group membership data in accordance with certain embodiments of this disclosure.

Turning now to FIG. 2, system 200 is provided. System 200 can provide for adaptively selecting group size data and group membership data. In some embodiments, system 200 can provide for adaptively selecting group membership data and/or determining which user equipment devices (e.g., UEs 110) are to be grouped. Generally, system 200 can comprise a processor and a memory that stores executable instructions that, when executed by the processor, facilitate performance of operations. Examples of the memory and processor can be found with reference to FIG. 15. It is to be appreciated that some portions of computer 1502 can represent a portion of a server device of a communications network or a portion of a user equipment device and can be used in connection with implementing one or more of the systems or components shown and described in connection with FIG. 1 and other figures disclosed herein.

System 200 can include one or more core network devices 102. As one suitable example used for the remainder of this disclosure, this core network device(s) 102 can be MME 104 that, in many communication networks is responsible for tracking mobility of UEs 110 and so forth. System 200 can further include one or more access point devices 202. As one suitable example used for the remainder of this disclosure, at least one of these access point device(s) 202 can be eNB 108.

MME 104 can determine network load data 204 that can represent utilization of a network resource associated with communication network 100. In some embodiments, this network resource can be control plane 112 resource (e.g., a control channel). Thus, network load data 204 can be a control plane load. In other embodiments, network load data 204 can relate to other aspects of communication network 100, including in some cases a load associated with data plane resources, which can be determined by other network components and forwarded to MME 104. Network load data 204 can reflect a number of devices connected to communication network 100 or to a portion of communication network 100 (e.g., a particular serving gateway, a particular eNB 108 or other access point device, etc.), a measurement of network traffic at some portion of communication network 100, a determined quality of service (QoS) associated with some portion of network 100, a count or estimate of devices that are trying to connect to network 100, or any other suitable load metric.

MME 104 can be configured to generate a paging message data structure 206 that can include various data or other data structures. For example, paging message data structure 206 can include activation data 208 and group size data 210 and/or a data structure that can be populated with group size data 210. Activation data 208 can include identifiers associated with a group of UEs 110 to wake as well as an instruction to wake said UEs 110. As used herein, the terms "wake," "awaken," and "activate" are used substantially interchangeably and relate to instructing a device (e.g., UE 110) to switch from an idle state to an active state. Generally, in order to switch to an active state from the idle state, the device (e.g., UE 110) initiates a RACH procedure to attach to communication network 100 via a selected eNB 108.

Group size data 210 can be indicative of a size of a group of UEs 110 that are to be awakened as a group. Advantageously, MME 104 can determine group size data 210 as a function of network load 204. Hence, group size data 210 can adapt based on network conditions rather than representing a static quantity. Upon determination of group size data 210, such data can be stored to paging message data structure 206 and provided to eNB 108, instructing eNB 108 to wake all the devices included in the group identified by paging message data structure 206. It is understood that paging message data structure 206 can be delivered to multiple eNB 108 devices. Since the devices of a group to be awakened are in the idle state, the location of devices with mobility is not known with certainty, so tracking area lists can be checked to select the eNB 108 devices that are most likely to serve the UEs 110 in the group to be awakened. For devices in which mobility is not expected (e.g., smart meters or certain other M2M devices), the location may be known with relative certainty and/or the tracking area list might include only a single (or a few) eNBs or other access point devices. It is further understood that a group can in fact be a subgroup (e.g., subset of the group), which is further detailed infra.

In some embodiments, MME 104 can determine group membership data 212. Group membership data 212 can be indicative of the specific UEs 110 that are to be grouped together and thus awakened substantially together. Group membership data 212 can be determined based on various defined characteristic data 214 associated with potential members of the group. In some embodiments, characteristic data 214 can be, e.g., type data 216 indicative of a type of UE 110 device, type size data 218 indicative of a number of UE 110 devices of a given type in the group, frequency data 220 indicative of a known or estimated frequency the UE 110 device is paged in a specified period, last known location and/or tracking area list data, or other suitable characteristics.

For example, selecting group membership 212 can be a function of: whether a particular UE 110 is a M2M device, or associated with a particular network or third-party entity (e.g., type data 216); whether numerous other UE 110 devices are already in the group (e.g., type size data 218); whether paging messages can be scheduled (e.g., frequency data 220); whether a UE 110 device is in a service area associated with network 100 or a third-party (e.g., smart meters in a specific zip code or utility provider service area), whether a UE 110 device is at a particular known or probable location or area, and so on. It is understood that other factors can be employed in connection with selecting group membership 212 and the above examples are intended to be illustrative but not limiting.

As noted previously, once group membership 212 and group size data 210 are determined, paging message data structure 206 can be provided to eNB 108 device(s) to attempt to awaken the UE 110 devices in the group. In response to paging message data structure 206, eNB 108 device(s) can forward relevant information to the UEs 110 in the group, which will then wake and attempt to connect to network 100. eNB 108 device(s) can transmit connection requests 222 to MME 104. Ideally, all such connection requests 222 will complete successfully, but in some cases failures will result instead, typically followed by reconnection attempts. Based on these connection requests 222 and information relating to whether such was successful, failure rate data 224 can be determined by MME 104. For instance, failure rate data 224 can be indicative of a proportion of UE 110 devices of the group that failed to establish a connection in response to the group paging.

Based on this feedback, MME 104 can, in some embodiments, initiate an update 226 to the previously determined group size data 210. If failure rate data 224 indicates a high failure rate, then it can be inferred that too many UE 110 devices are attempting awaken during a given cycle and, thus, the group size is too large. Hence, such failure rate data 224 can result in an update 226 that reduces the group size associated with group size data 210. Conversely, a low failure rate (e.g., zero) can indicate very few collisions and/or retries in connection with the RACH procedures, in which case it may be determined that the group size can be increased to reduce paging channel 114 overhead. It is understood that update 226 can reflect the most current data available including both failure rate data 224 and current network load data 204, as such might have changed in the interim.

Figure 3:
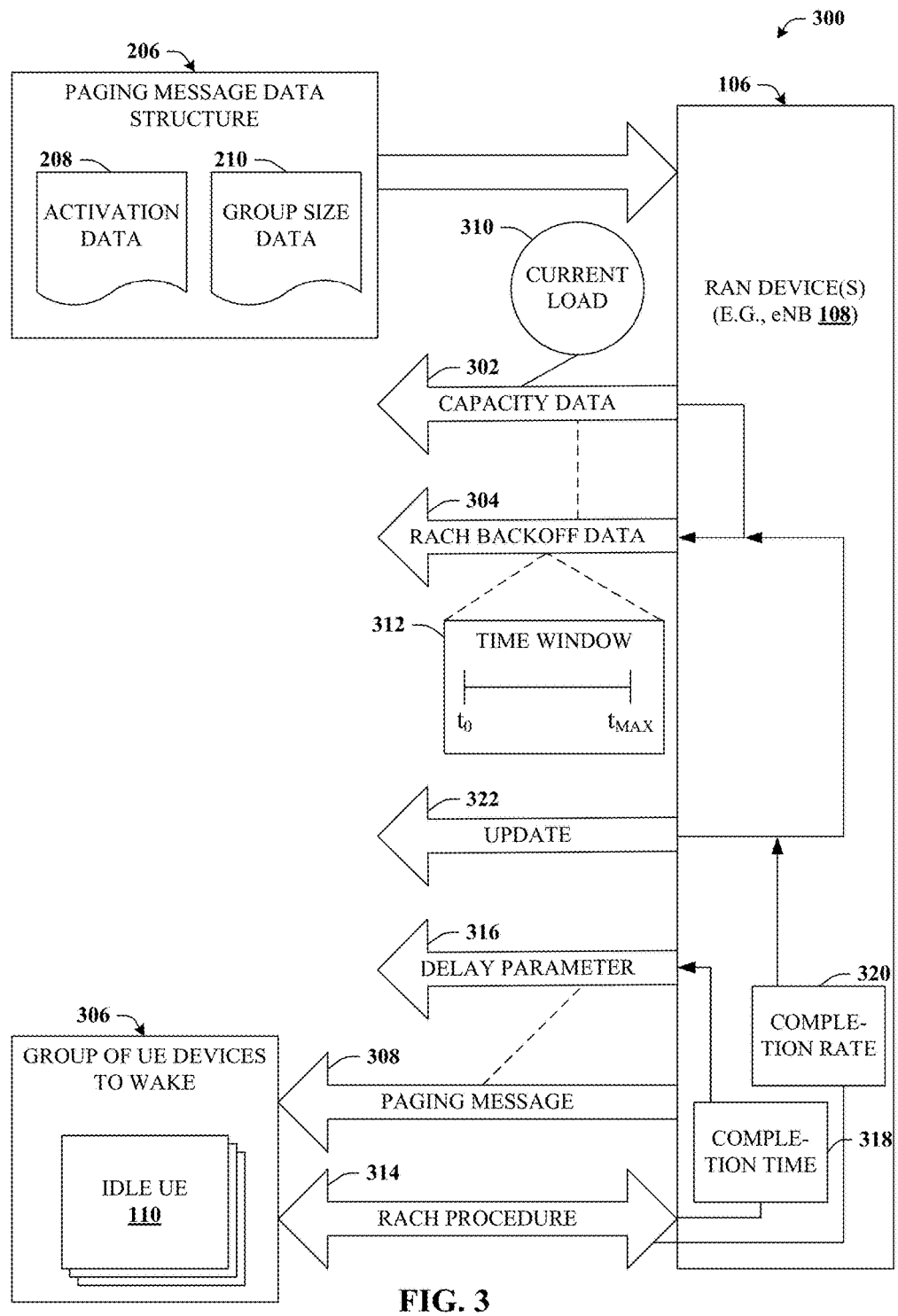
FIG. 3 illustrates a block diagram of an example system that can provide for adaptively selecting a suitable backoff parameter associated with delaying initiation of a network connection attempt in response to a group paging message in accordance with certain embodiments of this disclosure.

Referring now to FIG. 3, system 300 is depicted. System 300 can provide for adaptively selecting suitable backoff parameters associated with delaying initiation of a network connection attempt in response to a group paging message. Apart from the adaptive grouping mechanisms detailed at FIG. 2 that can be determined in the core network of communication network 100, adaptive backoff parameters detailed below can be determined at a RAN portion of communication network 100, such as via eNB 108. For example, eNB 108 can receive paging message data structure 206, which can include activation data 208 (e.g., an instruction to wake a group of UE 110 IDs) and group size data 210 (e.g., a number of devices that are to awaken as a group that was determined by MME 104 in the above example relating to FIG. 2). It is understood that group size data 210 can be included in activation data 208 (e.g., a count of the UE 110 IDs can indicate group size).

eNB 108 can determine capacity data 302 that can be indicative of a first number of user equipment device connections supported by eNB 108. For example, suppose eNB 108 can support network connections with 5,000 UE 110 devices at a time. In that case, capacity data 302 can be determined to be 5,000. Such a determination can be based on a variety of metrics associated with the configuration and hardware associated with eNB 108. Further, eNB 108 can determine RACH backoff data 304, which can be determined as a function of a ratio of group size data 210 and capacity data 302. Further suppose that group size data 210 indicates that group 306 has a group size of 1,000 UE 110 devices (e.g., 1,000 devices served by eNB 108 are to be awakened together). In the above example, the capacity is approximately 5,000, whereas the group size is 1,000, so RACH backoff data 304 can be determined as a function of a suitable ratio, e.g., 1,000/5,000, or a proportion of 20%. In some embodiments, capacity data 302 can be based on current load 310 and/or a number of existing active connections (e.g., connections with devices that are not in group 306). For example, if 1,000 devices are actively connected to eNB 108 with a capacity of 5,000, then RACH backoff data 304 can be determined as a function of 1,000/(5,000−1,000) or a proportion of 25%.

Upon determining RACH backoff data 304, paging message 308 can be transmitted to the group 306. Paging message 308 can include activation data 208, instructing those idle UE 110 devices in group 306 to wake. Paging message 308 can also include RACH backoff data 304 that instructs the UE 110 device in group 306 to delay attempting to attach to eNB 108 by a random amount of time (or according to another delay mechanism). Because of this random delay, not all UE 110 devices of group 306 will attempt to wake at the same time, but rather according to a random distribution of start times bounded by time window 312 that is included in RACH backoff data 304. Due in part to this delay that can be independently determined by each UE 110, RACH collisions can be reduced since those UE 110 device will initiate RACH procedures 314 (e.g., to attach to eNB 108) only after the random delay, the bounds of which are specified by RACH backoff data 304. Moreover, recall that RACH backoff data 304 can be determined based on capacity data 302. Hence, time window 312 can adapt in response to a current capacity associated with eNB 108.

In addition to the random delay determined based on time window 312, eNB 108 can, in some embodiments, determine another delay parameter 316. Delay parameter 316 can be directed to preventing overlap between RACH procedures 314 associated with a first paging message 308 and RACH procedures 314 associated with a second paging message 308. Delay parameter 316 can be determined as a function of completion times 318 or completion rate 320 and can be included in paging message 316.

Completion times 318 relates to a time by which RACH procedures 314 associated with group 306 are completed (e.g., all UE 110 devices have successfully attached to eNB 108). It is observed that, ideally, completion time 318 will not be significantly more than time window 312 or another suitable time, but if that is not the case, delay parameter 316 can make up the difference. Completion rate 320 can relate to a proportion of UE 110 devices in group 306 that completed RACH procedures 314.

In some embodiments, eNB 108 can determine update 322. Update 322 can be determined as a function of completion rate 320. Update 322 can be employed to update RACH backoff data 304. For example, if completion rate 320 is below a given threshold, such indicates that too many UE 110 devices failed to complete RACH procedures 314. One reason for such may be that RACH 116 was overwhelmed and/or too many collisions occurred, which, upon retry, cascaded to many more collisions until a timeout. However, by increasing time window 312, such difficulties can be mitigated, thus RACH backoff data 304 can be adaptively updated based on completion rate 320, as well as based on capacity data 302 (which may have changed in the interim).

Example Architectures, Embodiments, and Benefits

In this section, the impact of M2M growth on the specific cellular network function of device activation is explored. As will be demonstrated, expected M2M use cases will indeed overwhelm current device activation mechanisms, leading to unacceptably large activation times, or even failure to activate devices. Network-agnostic naive strategies to address these concerns simply shift the overload condition from one mechanism to another. Based on these insights, a holistic and adaptive approach to device activation is provided herein in one or more example embodiments. An architecture for cellular device activation is provided herein that will allow a network to dynamically adapt the manner in which it performs device activation by taking into account current network conditions as well as M2M application specific dynamics.

Some advantages provided by the disclosed subject matter are more efficient device activation without requesting or requiring additional radio resources, minimal changes to existing mechanisms, and without reliance on applications to adapt their behavior to protect the network. To these ends, a focus detailed herein is to develop a detailed understanding of the existing device activation mechanisms in LTE access networks, to identify the primary bottlenecks associated with such mechanisms that impact the network performance and to explore the realm of adaptive techniques that the network can apply to perform efficient device activation even in the presence of large scale M2M arrivals. Specifically, a group-based device activation procedure is proposed, using a co-operative paging and random access scheme, that dynamically adapts the group sizes based on the current network conditions.

It is noted that overload control for M2M arrivals is considered a high priority item by 3GPP standards body, and different methods for overload control are proposed including group based access of M2M devices. The disclosed subject matter is aligned with these efforts, and addresses many of the issues left open by earlier proposals concerning group assignment and management, optimal group size selection, adaptive load distribution, and (sub)group activation scheduling. Also, our methods do not request or require access-barring or exclusive resource reservation for M2M to prevent network overload unlike some of the earlier proposed schemes.

One design principles is to not change the legacy H2H devices, and adaptation of the M2M device activation procedures in order to minimize the impact on the existing H2H communications. The disclosed embodiments, thus, also support broader thinking that different device/applications will be treated differentially and our grouping based approach, while following the same adaptive methods within a group, also adapt to different (access) methods used across groups and provides architectures to support such differential group treatment.

Certain advantages provided by the disclosed subject matter can include, for example:

A demonstration, using data driven simulation, of the fragile nature of current device activation mechanisms and the negative impact that M2M applications have on existing H2H and H2M traffic. Results show that large scale M2M arrivals can cause unacceptably high failure rates (as high as 38.58%), and increased device activation time (factor 4 increase) when using the existing mechanisms.

An adaptive device activation architecture is presented that allows the network to accommodate M2M applications without overloading the network. In this regard, the disclosed architectures can enable dynamic group formation of M2M devices and execute group based activation mechanism to prevent network overload conditions.

Group based activation algorithms are disclosed that allow the network to dynamically adapt to network conditions and to efficiently distribute the M2M load ensuring minimal impact to ongoing H2H communications. For example, a co-operative paging and random access scheme is proposed that allows efficient distribution of M2M load based on availability of the limited control plane resources. Also presented are an adaptive backoff scheme that enables efficient distribution of M2M load, and an algorithm to select the optimal paging group sizes dynamically, based on current network conditions. Such mechanisms can also ensures proper separation of consecutive group accesses to achieve very low failure rates.

Also presented is a simulator model of the LTE device activation procedure to evaluate the disclosed algorithms and/or mechanisms using data from a large cellular provider as background (H2M) traffic. The model is evaluated with a demanding M2M use case (30000 arrivals/10s) to show the efficient scalability of our adaptive algorithms under extreme workloads. Further, disclosed mechanisms are equally applicable to other (not so demanding) scenarios as they dynamically adapt to network conditions to ensure efficient and/or optimal use of limited network resources. Results demonstrate the disclosed adaptive mechanisms can achieve almost zero failure rates in device activation, with negligible impact on H2H communications, even in the presence of very demanding M2M arrivals.

Figure 4:
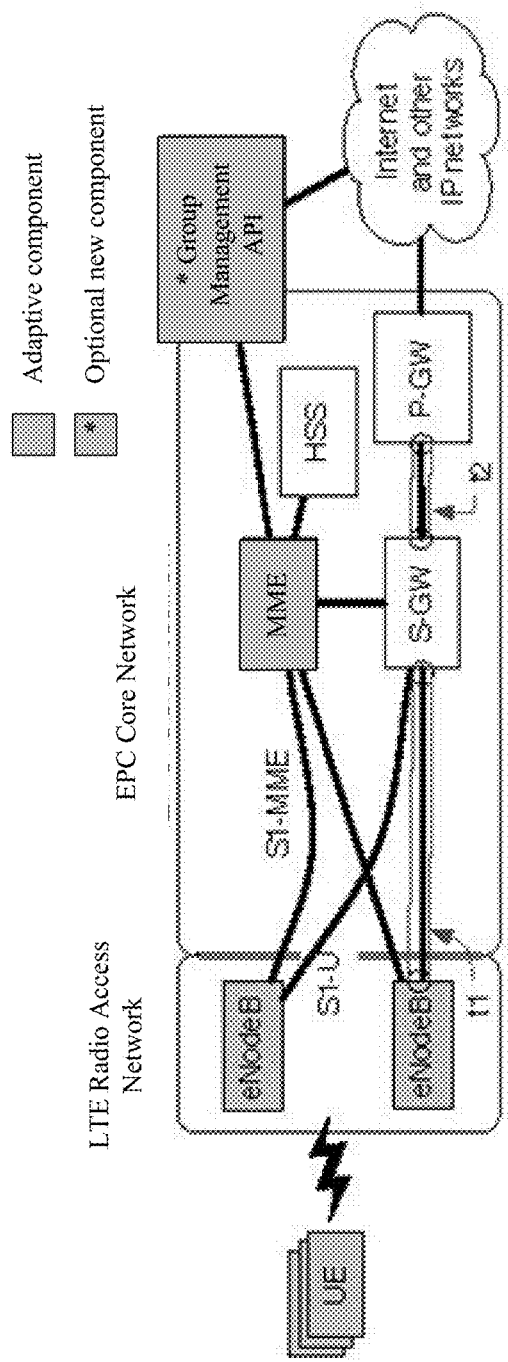
FIG. 4 illustrates a block diagram of an example system that illustrates an example LTE/EPC Architecture in accordance with certain embodiments of this disclosure.

The forthcoming examples, embodiments, and/or advantages are provided in the context of long term evolution (LTE) and evolved packet core (EPC) technology. Turning now to FIG. 4, system 400 illustrates an example LTE/EPC Architecture. System 400 can represent an example embodiment of communication network 100 of FIG. 1. System 400 depicts various components of an LTE/EPC mobile communication system, with shaded components forming part of the disclosed adaptive approach. The LTE RAN consists of eNodeBs (e.g., eNBs 108), which communicate with mobile devices (e.g., UEs 110) via the radio link. The eNodeB also performs radio resource control and cooperates with the MME (e.g., MME 104) for mobility management. The EPC consists of the MME, serving gateway(s) (S-GW), and packet data network gateway(s) (P-GW). The MME is a control plane only function responsible for user authentication via the HSS (Home Subscriber Server) and mobility management. It also interacts with the S-GW for data session establishment/release. The S-GW and the P-GW are on the data path, and their main function is packet routing/forwarding.

When the UE has no data to send, it goes to an idle state (e.g., low energy state) with no active radio connection and the data tunnel t1 is torn down by the network. In this idle state, the location of the UE is known to the network in the form of a tracking area (TA) list of eNodeBs, which the MME assigns to the UE. An idle UE wakes up periodically according to a configured discontinuous reception (DRX) cycle to check for potential activation requests (paging) from the eNodeB.

LTE/EPC device activation consists of two procedures, paging and random access (RACH). If a data packet arrives from the external network for a UE in the idle state, the MME sends a paging request to all the eNodeBs in the TA list of that UE. The eNodeBs, in turn, calculate the paging slot for the UE based on the UE identifier and send a paging indication (e.g., paging message 308) in the calculated slot. The UE wakes up periodically (e.g., once per DRX cycle) to monitor the paging channel for incoming paging requests in its corresponding slot. If the UE finds a paging indication in the slot and one of the UEID(s) (multiple UEIDs can map to the same paging slot) sent in the corresponding paging message matches its own identifier, the UE starts connection setup towards the network using a random access channel (RACH) procedure (e.g., RACH procedure 314). Both paging and RACH related messages are sent on a shared control channel with limited resources. The network is limited in the number of devices that can be activated per paging or random access slot. Hence if a large number of devices contend for these limited resources at the same time, it will lead to excessive activation failures and activation delays.

Figure 5A:
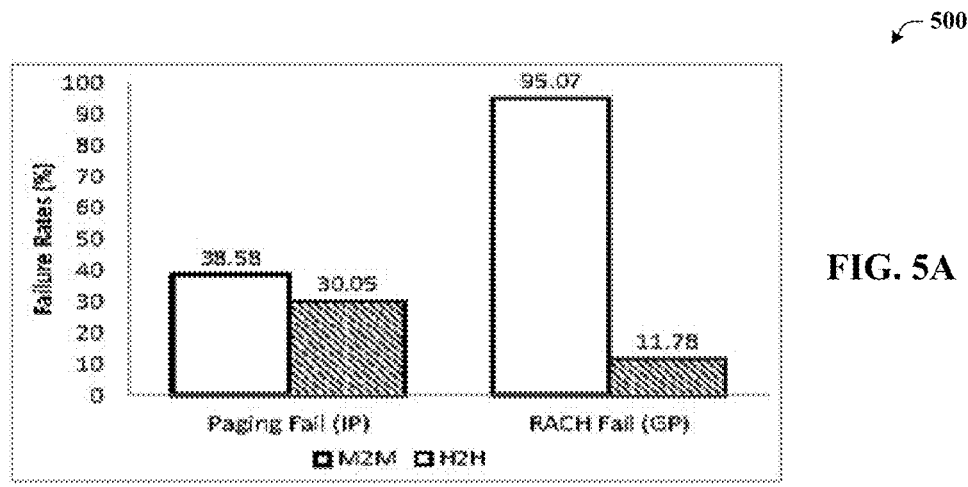
FIGS. 5A-5C provide example graphical illustrations that depict failure rates, wait times, collisions and other data in connection with a specific use-case in accordance with certain embodiments of this disclosure.
Figure 5B:
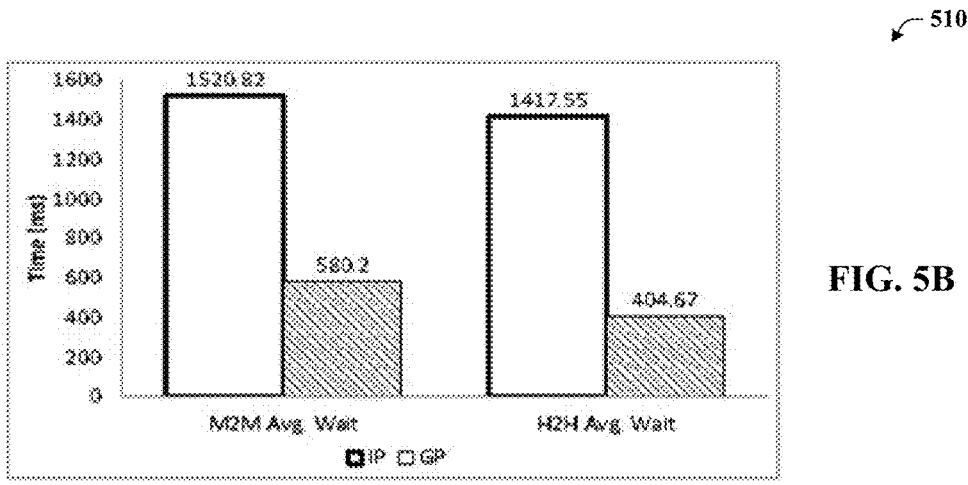
Figure 5C:
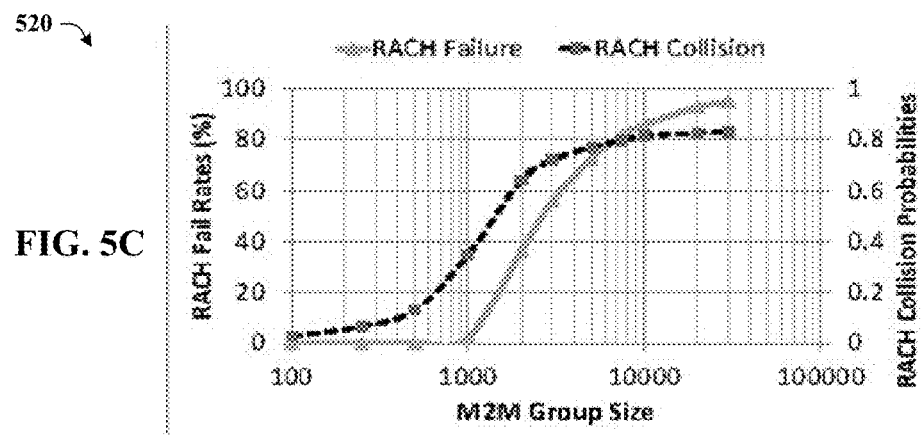

While still referring to FIG. 4, but turning now as well to FIGS. 5A-5C, graphic illustrations 500, 510, and 520 are depicted, respectively. Graphic illustrations 500, 510, and 520 depict failure rates, wait times, collisions and other data in connection with a specific use-case. These figures illustrate the fragile nature of current LTE/EPC device activation mechanisms by considering a demanding, but realistic, use case involving smart meters in a dense urban environment. Specifically, the use case involves 30,000 M2M devices (smart meters) per cell, being activated by the network in a 10 second interval to report status, for example because of a restored power failure or periodic reporting frequently used in current M2M deployments. A pull-based model is assumed in this example, which is aligned with the approaches advocated by 3GPP standards body.

A data driven simulation framework is used, which is described in detail below, to show the inadequacy of the current device activation procedure to handle the M2M-induced overload scenario described above (30000 request arrivals over 10 s). The first column in FIG. 5A shows that for the demanding M2M load, the existing individual paging (IP) mechanisms result in a 38.58% paging failure. The impact on background H2H traffic is equally severe with a 30.05% paging failure. Note that, these results are for a network configured with very high paging capacity. In operational networks, the practical capacity can be much less, so even less demanding M2M use cases can cause similar breakdown of the current procedures.

At the same time, a network agnostic naive grouping strategy (GP), where all the M2M devices are paged as a single group to solve the paging overload problem, will overwhelm the current RACH procedure as shown in the second column of the FIG. 5A. FIG. 5C shows how the RACH performance deteriorates with increasing M2M group arrival sizes.

The M2M induced overload scenario also increases the device activation time for both M2M and background H2H traffic (FIG. 5B). It is noted that 3GPP target device activation time (excluding paging delay) is below 50 ms. High activation times negatively impact user-perceived performance, and can also lead to timeouts in long-lived TCP connections, typically maintained by application servers to current smart phones.

These results provide motivation to design an adaptive group-based device activation procedure that dynamically adapts the paging group size based on the available RACH capacity. In essence, a collaborative design is proposed that performs a joint optimization of the paging and the RACH procedure, based on the available limited control plane resources, at the same time ensuring that existing H2H communications are minimally impacted by demanding M2M use cases. An alternate design could be to use a single paging-group, and a sufficiently large random backoff window in RACH to reduce contention. We do not consider this alternate design because of its inflexibility to adapt to current channel condition. The available channel capacity continuously changes as devices from different applications with diverse access patterns access the network. A conservative selection of the backoff window to deal with the varying channel capacity will lead to inefficient channel utilization. On the other hand, an aggressive backoff window will result in increased collisions in presence of temporal high load. Spreading M2M paging into batches controlled by the network gives finer control as time evolves, and allows efficient utilization of the scarce resources by opportunistically adapting the batch sizes based on network conditions.

Figure 6:
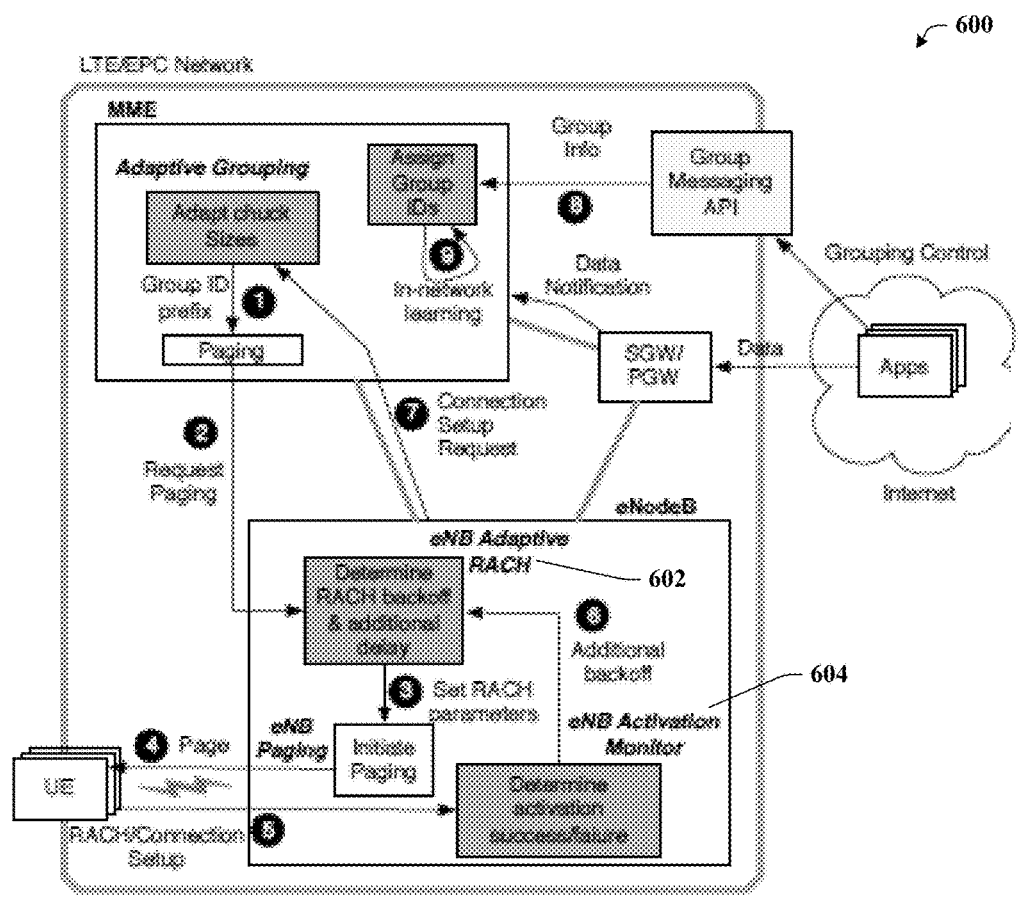
FIG. 6 illustrates a block diagram of an example system that can represent another example LTE/EPC demonstrating operation of disclosed adaptive mechanisms or techniques in accordance with certain embodiments of this disclosure.

Referring now to FIG. 6, system 600 is depicted. System 600 represents another example LTE/EPC that demonstrates operation of disclosed adaptive mechanisms or techniques. System 600 can represent another embodiment of communication network 100 detailed in connection with FIGS. 1-3. As discussed, various architectures and the adaptive algorithms can be employed to enable efficient, scalable device activation in the context of an LTE/EPC network architecture. Fundamental to some embodiments of the disclosed approach is the ability for mobile devices to be paged as a group, and dynamically adapt the group assignment based on the network conditions. The adaptive components of such a design are described below.

System 600 depicts certain examples of key components of the design with various steps or acts #1-#9 labeled in FIG. 6 as numerals 1-9 in black circles. The design enables the network to page a large set of devices using batches of chunks (subgroups), and to dynamically adapt the chunk sizes based on the current network condition. The adaptive grouping function in the MME is responsible for selection of a suitable chunk (subgroup) size, and for generation of a proper Group ID (#1) to send a paging request (#2) for the corresponding chunk to the eNB. The eNB, in turn, determines suitable backoff parameters based on the selected chunk size to ensure low collision probabilities in the RACH access (#3), and sends a paging request across the RAN (#4) for the corresponding chunk. The UEs belonging to the chunk initiate their RACH access (#5) based on the eNB indicated backoff parameters. The eNB adjusts the RACH parameters for the subsequent chunks based on the RACH completion rate of the previous chunks (#6). Similarly, the MME adapts the current chunk size based on the connection setup request rates received from the eNB (#7). The Assign Group IDs function is responsible for an initial adaptable group identifier assignment to the UEs based on either explicit group information provided by applications (#8) or by in-network learning in the MME (#9).

Paging a large set of devices as a group improves the paging channel efficiency significantly but, as a side effect, leads to dramatic increase in RACH failures and collisions. Presented is an adaptive backoff scheme, based on the group size, to prevent devices in the same group from competing for the random access channel at the same instant. It is proposed that when a group of N devices are paged using a single group identifier, all the devices in the group select and wait for a random amount of time $B_{init}$ in $[0, f(N)]$, before starting the RACH procedure. $f(N)$ is calculated as follows:

$$f(N) = (N/N_{RA}^{max}) * T_{RA} \quad (1)$$

where $T_{RA}$ is the periodicity of random access slots as configured by the network, and $N_{RA}^{max}$ denotes the maximum number of devices that can complete the RACH procedure in each slot. Therefore, $f(N)$ is an estimate of the time taken for a group of N devices to complete the RACH procedure in an ideal scenario with no background traffic and no collisions. The intuition behind such a choice of the backoff window, $[0,f(N)]$, is that if everything goes well, the devices will backoff for just the right amount of time and initiate the RACH procedures such that there are no collisions while all RACH slots are fully utilized. The eNB adaptive RACH function 602 computes the value of $f(N)$ and communicates the same to the devices in the paging message itself.

It is understood that the concept of using random backoff to distribute load is not new, and also proposed as solutions for overload control in 3GPP. Thus, contribution associated with the disclosed subject matter is a simple yet efficient backoff scheme that can adapt to different M2M arrival patterns and, as demonstrated below, provides the flexibility to distribute a group arrival in smaller chunks according to network conditions, dynamically. Below is an example algorithm to determine a non-overlap delay parameter (e.g., delay parameter 316).

---

Algorithm 1 Algorithm for finding $\delta_a$ for chunk i of size C

1: if (At least one of the previous chunks have completed RACH access) then
2:     $R_C$ = RACH access completion time for the most recent completed chunk
3: else
4:     $R_C$ = K * f(C) (from Equation 1)
5: end if
6: numRemaining = number of devices of chunk (i − 1) still accessing the RACH
7: If chunk (i−1) has not started RACH access yet. numRemaining = C
8: $\delta_a = (R_C/C) *$ numRemaining

---

It is understood that when using smaller chunks to activate a large number of devices, it is possible for the paging request for a chunk to arrive at a time when the RACH procedure for some previous chunk(s) is in progress. In such scenarios, RACH access attempts of the different chunks will overlap with each other leading to increased RACH collisions and failure. To prevent this, we propose that the eNB sends an additional delay parameter $\delta_a$ in the paging message and all the devices belonging to the chunk defer their RACH attempt by an additional $\delta_a$ time. The eNB activation monitor function 604 monitors the RACH completion times ($R_C$) 318 of the previous chunks and passes the information to the eNB Adaptive RACH function 602, which, in turn, uses the most recent $R_C$ 318 value to dynamically estimate $\delta_a$ using Algorithm 1, for instance. $R_C$ 318 can be estimated based on the measurement of the most recent RACH access completion time of a chunk. In the case where some devices of a chunk fail to complete the access procedure, the eNodeB can detect such failures using existing timeout-based methods, and determine the chunk access completion time based on the information of both successful and failed access counts (e.g., completion rate 320).

Initially when an estimate of RC 318 is not available, the eNB conservatively sets $R_C = K * f(C)$ where the factor K accounts for additional delays related to background load, collisions etc. The factor K only impacts the first few chunks until one of the previous chunks completes RACH access, and can be set based on past history (K=3 is used in this evaluation). The eNB sends f(C) and $\delta_a$ along with the group identifier in the paging message, where C is the chunk size, and all devices belonging to a chunk first wait for $\delta_a$ time and then initiate a backoff for a random time in $[0,f(C)]$ before starting the RACH procedure.

Instead of the devices waiting for an additional $\delta_a$ time, the eNB could possibly delay sending the paging message by the same amount of time. However, this alternative may not be preferred because a paging message can only be sent in the specific slots corresponding to the group identifiers, and waiting for the next paging slot will incur unnecessary delays (at least one paging DRX cycle) in the access completion.

With regard to automatic chunk size selection, presented now is a method that allows the network to dynamically estimate, based on the current control channel load, a chunk size that provides low failure rates for both paging and RACH, while minimizing the RACH access time. In this method, the network initially selects a default minimum chunk size (e.g., 100) that avoids high paging failures (very small chunk sizes will result in large number of paging messages being sent out, thereby increasing paging collision and failure rates). Then the network dynamically adapts the chunk size based on the observed network conditions.

According to this approach, the network selects the chunk size, C, such that:

$$N_C^T = T/d_C \leq Ps \quad (2)$$

and, $$N_C^T * R_C \leq T \quad (3)$$

where T is the paging DRX cycle, $d_C$ is the arrival duration of a chunk of C devices, $N_C^T$ is the number of chunks that arrive within a paging DRX cycle, $P_s$ is the paging slot capacity, and, $R_C$ is the estimated RACH access delay for chunk size C. Equation 2 ensures a maximum capacity of a paging slot is not exceeded, and Equation 3 ensures that all previous chunks have completed their access procedure before the new set of chunks arrive in the next DRX cycle. If no C that satisfies equations 2 and 3 is found, a search for a suitable C is repeated over two DRX cycles, e.g., we try to find C, such that chunks arriving over 2T can complete their RACH access in 2T without exceeding the overall paging capacity 2*Ps. E yen after searching over two DRX cycles, if a suitable C is not found, we choose C such that $d_C = 2T$, e.g., we choose a chunk size whose arrival duration is close to (but less than) 2T. This choice ensures that the average delay experienced by devices in a chunk does not exceed the paging DRX cycle value, T. Our selected chunk size depends on $R_C$, which, in turn, depends on the network condition, e.g., $R_C$ is likely to increase when the network is experiencing high load. The disclosed techniques ensure that the selected chunk size dynamically adapts to changing network conditions.

Figure 7:
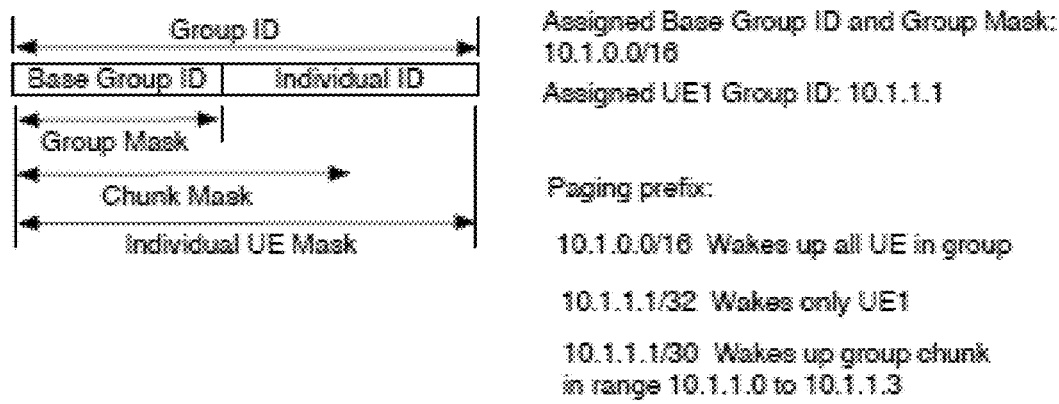
FIG. 7 depicts an example diagram that provides an example of a group identifier that can be used in connection with adaptive techniques in accordance with certain embodiments of this disclosure.

Referring now to FIG. 7, illustration 700 is presented. Illustration 700 provides an example of a group identifier that can be used in connection with adaptive techniques disclosed herein. With regard to adaptive group identifiers, presented is a group assignment approach that the network may utilize to implement the adaptive algorithms described earlier. The network assigns the devices a group identifier (ID) which is explicitly communicated by the network using control message exchanges e.g., during initial attachment. As shown at FIG. 7, a Group ID can consist of two parts namely, a Base Group ID and an Individual ID. The relative size of each of these components is determined by a Group Mask. For example, as shown in FIG. 7 (and assuming conventional IPv4 like notation to simplify exposition), a base group ID and group mask of respectively 10.1.0.0 and /16 means a base group ID of 16 bits, leaving 16 bits for the individual IDs. Base group IDs can be thought of as an identifier for the application, and the individual IDs as the device identifiers the application sends to and receives data from.

To address a group of devices, the MME uses a Paging Prefix consisting of a group ID and a mask. A device compares its full group ID to the paging prefix to determine whether the device is to wake up. For example, as shown in FIG. 7, a paging prefix using the group mask, e.g., 10.1.0.0/16, will activate all UEs in the group. On the other extreme, using an Individual UE Mask of /32 a specific UE within the group can be awakened. Using a Chunk Mask (or sub-group mask) in between these extremes, allows the MME to address subsets of UEs along "prefix-like" boundaries. Once assigned, the group identifiers of the individual UEs within a base group remain the same throughout, and the prefix based approach allows the MME to dynamically address different subgroups (chunks) within the same base group without explicitly informing the UEs each time the subgroups are updated.

With regard to the simulation framework, we model the LTE eNodeB paging procedure and the first two steps (preamble transmissions and random access responses) of the RACH procedure as described supra. The subsequent messages for connection establishment are sent over dedicated (non-shared) resources, and we therefore do not model them for our evaluation. We implement the dynamic group adaptation (automatic chunk size selection) and the adaptive RACH algorithms.

The paging slot for a UE device is given by a system frame number (SFN) and a paging occasion (PO) which is calculated based on its identifier (UEID), DRX cycle (T), and a network specific parameter nB, which specifies how many paging occasions (POs) or slots are available per system frame. The number of UEs that can be paged in a slot is given by the paging slot capacity ($P_s$) of the eNodeB. After receiving a paging message, the UE starts connection setup using the RACH procedure by selecting a preamble from a set of available (network specific) random access preambles and sends the same to the eNodeB in the next random access slot. In case more than two UEs select the same random access preamble in the same slot, we randomly choose one of the UE as the contention winner. The eNodeB responds with a random access response (RAR) message which should reach the UE within a network configured time window $W_{RAR}$, otherwise the UE considers the previous step failed and restarts the RACH procedure. The network is also limited in the number of identifiers (preamble reception acknowledgement) it can send in a single RAR ($N_{RAR}$) due to radio resource constraints. This implies the network can only reply to $W_{RAR}*N_{RAR}$ ($N_{RA}^{max}$ in Equation 1) UEs per random access slot. UEs that either collide in preamble transmission or do not receive a RAR, restart the random access procedure after a random backoff indicator (BI) time as indicated by the network.

TABLE I

Simulation Parameters

| Parameter | Setting |
| --- | --- |
| Random Access Slot Period | 5 ms |
| Total Number of Preambles | 54 |
| Max. Number of Preamble Transmissions | 10 |
| Number of UL Grants per RAR (NRAR) | 3 |
| Ra-ResponseWindowSize (WRAR) | 5 ms |
| Backoff Indicator (BI) | 60 |
| Paging DRX Cycle (T) | 640 ms |
| Paging Capacity per Slot (Ps) | 16 |
| nB | 1 |
| Max. Paging Retry Limit | 2 |

Table I presents our simulator parameters. We choose typical network configuration values to evaluate our work. In some cases, our parameter choice (e.g., $P_s$ & nB) is also driven by the fact that we want to investigate whether M2M communication pattern poses a challenge to the fundamental LTE radio access capacity. For example, we choose 640 ms as paging DRX cycle which strikes a good balance between paging slot wait times and frequent device wakeups. Again, we choose the random backoff indicator value (BI=60) to keep the activation delay within a tolerable limit.

For M2M arrivals we simulate the arrival of 30,000 activation requests uniformly spread over an interval of 10 s. We consider this demanding use case in our evaluation to show that our adaptive algorithms scale efficiently even with extreme workloads.

For H2H (background traffic) we use data obtained from a large cellular service provider in the US. The purpose of using this data is to show how the projected M2M traffic patterns affect the existing H2H communications. The data sample consists of one hour of LTE control plane data. This data, anonymized and aggregated over one second, consists of all GTPC-v2 control plane message exchanged between all MME-SGW pairs. We obtained a time series for both paging (Downlink Data Notification GTPC-v2 message) and new session requests (Create Session Request GTPC-v2 message) from this data. The data we obtained was collected during a relatively quiet network period. Therefore, as we explain below, we use a scaled version of the data in our simulations. Table II shows the essential statistics for both the one hour data sample and the scaled data. The table shows statistics associated with a representative eNB we use in our simulations. The "Data Sample" column shows the statistics derived from these time series. To scale the data to more realistic rates, we use the well known diurnal pattern in terms of traffic load, to scale the data by a factor 2, from the low volume hour, to a peak hour.

We note that our data did not contain "connection reestablishment" requests which are sent out when a UE in idle state wakes up because of application initiated activity. To account for these messages in our simulation we assume that connection reestablishment requests are of the same magnitude as new data session requests. The statistics of the resulting scaled data that we use in our simulations are shown in the "Scaled Data" column in Table II.

TABLE II

Data Statistics

| Loadtype | Data Sample Mean (max) | Scaled Data Requests/sec. (max) |
|---|---|---|
| Paging | 4.2 (15) | 8.4 (30) |
| New Session Requests | 2.32 (9) | 4.64 (18) |
| Idle UE Conn. Re-estab. | — | 4.64 (18) |

Our scaling of the sample data is conservative along several vectors. First, diurnal patterns often show larger differences (than factor 2) between low and peak times. Second, given predominant H2M use of current mobile devices, connection reestablishment can be expected to happen more frequently than new connection establishment. Finally, given that LTE/EPC deployments are relatively new, the bulk of mobile devices are still being served on 3G networks. For example, recent hourly averaged data from the same provider shows peak paging and peak RRC connection request rates of respectively 36 and 53 requests per second, indicating that our scaling factor is indeed conservative.

The M2M arrivals and the real H2H paging data serves as the input to the paging module in our simulator. The successfully paged UEs, in turn, are used as input to the RACH module. Additionally, the RACH module also takes as input the real H2H new data session requests and connection re-establishment as these messages also contribute to RACH contention. Each simulation run starts with the arrival of the first of the 30,000 M2M device activation requests which arrive uniformly over 10 s, and continues till all the M2M devices has completed (or failed to complete) the access (paging and RACH) procedures. Since the real trace is for 1 hour (much longer than our simulation period), for each simulation run we select a random starting point in the trace to avoid any bias in the evaluation. For each set of experiment, we use 20 simulation runs and present the average result of these 20 runs.

Results for our evaluation are presented below and various evaluation metrics associated with those results are summarized in Table III.

Figure 8A:
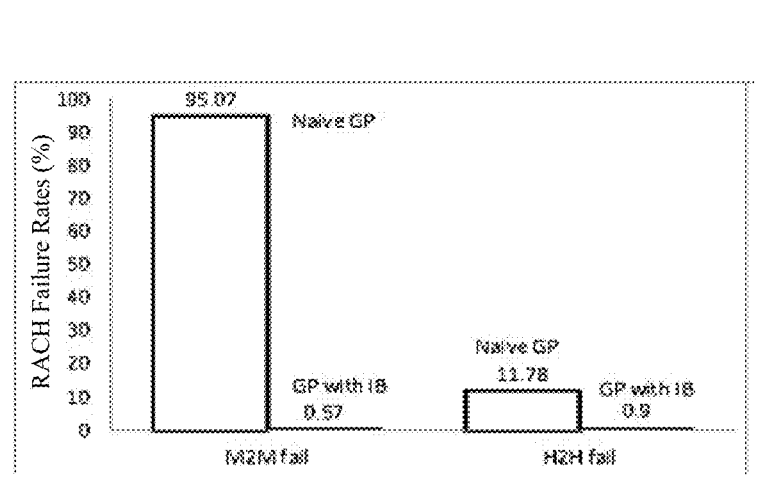
FIGS. 8A-8C depict example graphical illustrations that compare RACH failure rates, preamble transmission attempts and other data for the disclosed adaptive techniques compared to naïve implementations in accordance with certain embodiments of this disclosure.
Figure 8B:
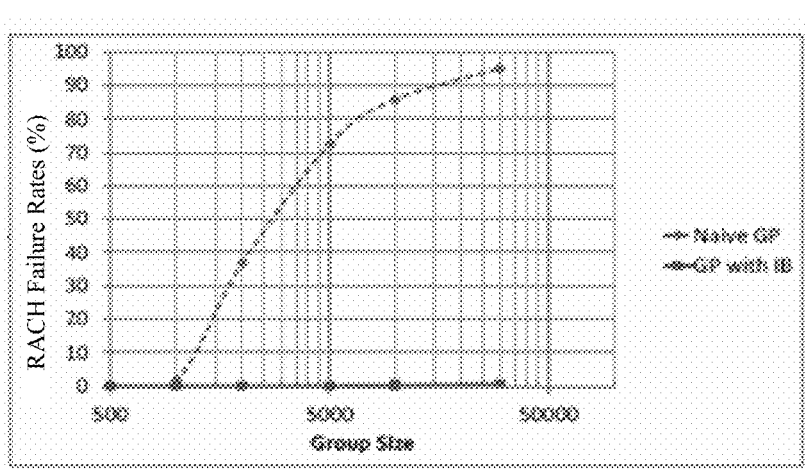
Figure 8C:
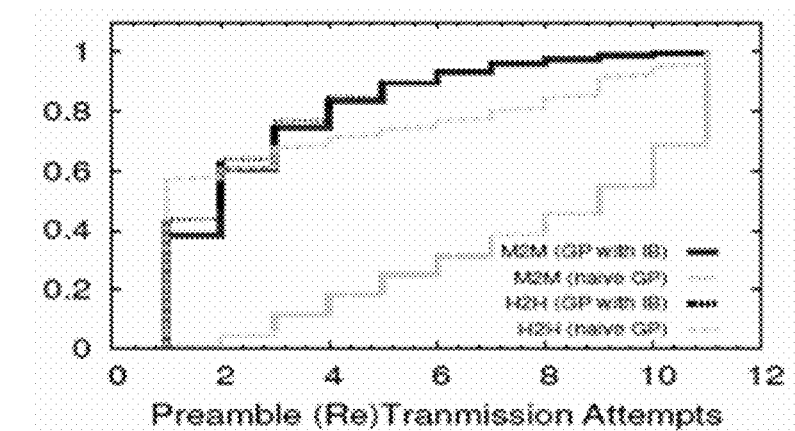

Turning now to FIGS. 8A-8C, graphic illustrations 800, 810, and 820 are depicted, respectively. Graphic illustrations 800, 810, and 820 compare RACH failure rates, preamble transmission attempts and other data for the disclosed adaptive techniques compared to naïve implementations. With regard to initial RACH backoff, illustration 800 shows how our adaptive initial backoff scheme (shown as GP with IB) dramatically reduces RACH failure rates as compared to a naive grouping strategy (shown as naive GP) with no adaptive backoff. Results are for group arrival of 30,000 devices in 10 s. As discussed, such arrival causes unacceptably high paging failures, whereas a naive grouping strategy simply shifts the bottleneck from the paging mechanisms to the RACH procedure. Our method helps overcome the RACH bottleneck with efficient distribution of load. For example, RACH failure rates for M2M devices reduces to only 0.57% (from 95%) and overall RACH collision rate reduces to 14.83% (from 76.65%) when using our strategy.

Illustration 810 shows how RACH failure rate varies with different group arrival sizes (with and without our proposed adaptation). We experiment with group arrival sizes of 500, 1000, 2000, 5000, 10,000 and 30,000, respectively. We see that, the RACH failure rates with a naive grouping strategy increases significantly as group size is increased. For example, the failure rate is close to 40% even for a moderately large group arrival of 2000. This indicates that, dividing a very large group into moderate sized subgroups and paging the subgroups individually does not work well without any adaptation. Our adaptive backoff scheme ensures that the RACH failure probability is almost zero for moderately large groups and even for a very large group of arrival 30,000, the failure rate is only 0.57%.

We present the CDF of random access preamble retransmission attempts at FIG. 8C via illustration 820. If a device fails to complete the RACH procedure after 10 retransmission attempts (excluding the initial transmission), it aborts the RACH procedure (e.g., a RACH failure). With each retransmission the devices increase the transmission power to improve the chances of preamble detection at the eNodeB, and large number of retransmissions negatively impact device battery consumption as well as wastes valuable network resources. From illustration 820, we see that more

TABLE III

Evaluation Metrics

| Metric | Description |
|---|---|
| Paging Collision Probability | Description Ratio of number of paging slots in which paging collision occurs, to the total number of paging slots. (Number of devices paged exceeds slot capacity.) |
| RACH Collision Probability | Ratio of the number of random access slots in which two or more devices select the same preamble to the total number of random access slots. |
| M2M Completion Time | Difference between the time when the request for device activation for the first device in a M2M group is received and the time when the entire group (last device in the group) successfully completes the connection setup procedure (excluding the devices that fail). |
| Average Wait Time | Average time a device is to wait from the time of device activation request to complete the connection setup. Computed for successful devices only. |
| Paging Failure Rate | Ratio of total number of devices that could not be paged after the maximum number of paging message retransmission attempts, to the total number of paging requests. |
| RACH Failure Rate | Ratio of total number of devices that could not complete the RACH procedure after maximum number of preamble retransmission attempts, to the total number of devices participating in the RACH procedure. | than 50% of the M2M devices undergo 9 or more retransmissions to successfully complete the RACH procedure while using a naive grouping strategy, whereas our scheme enables 90% of the M2M devices to complete the RACH procedure using only 5-6 retransmissions. Similarly, the 90th percentile for H2H retransmissions is almost 10 for a naive grouping strategy as compared to only 5 for our adaptive backoff scheme.

Figure 9A:
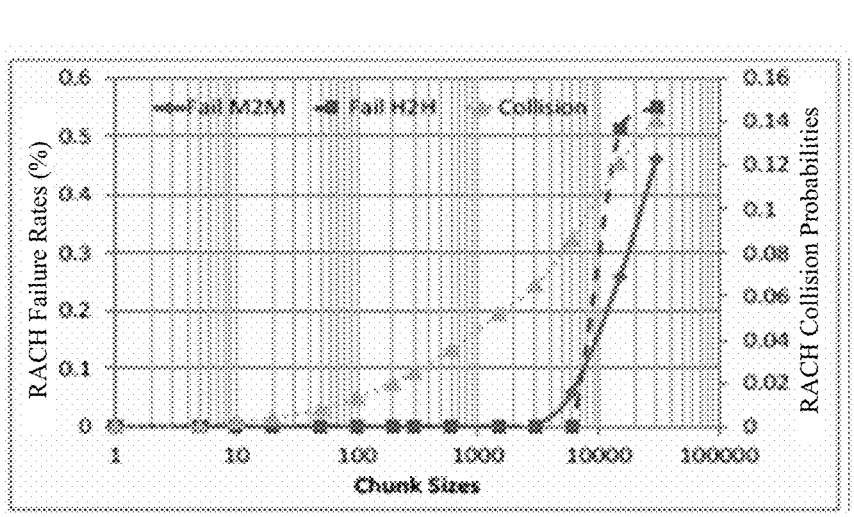
FIGS. 9A-9C provide example graphical illustrations that depict RACH failure rates, paging failure rates, and other data for the disclosed adaptive techniques compared to naïve implementations in accordance with certain embodiments of this disclosure.
Figure 9B:
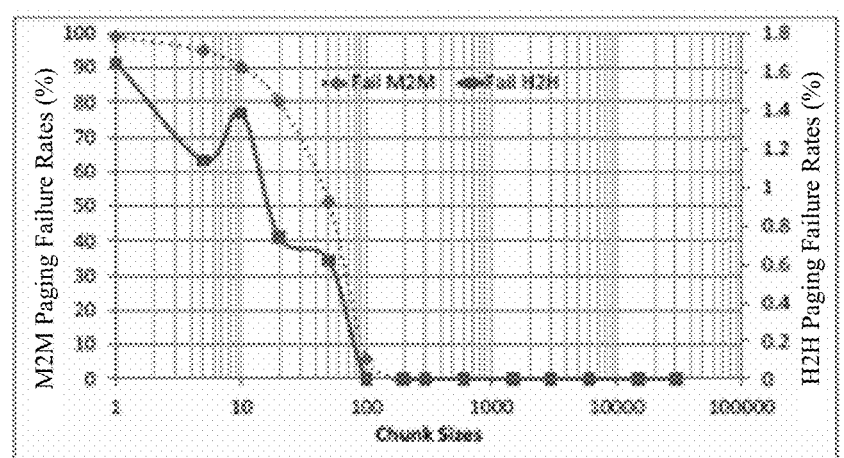
Figure 9C:
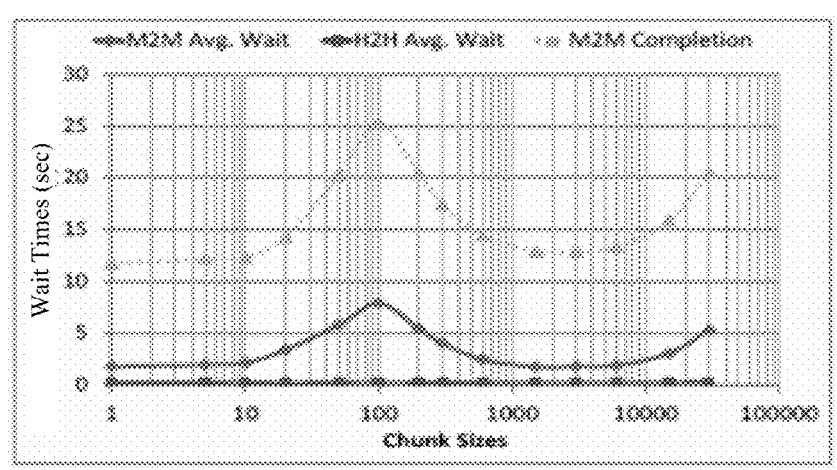

Referring now to FIGS. 9A-9C, graphic illustrations 900, 910, and 920 are depicted, respectively. Graphic illustrations 900, 910, and 920 depict RACH failure rates, paging failure rates, and other data for the disclosed adaptive techniques compared to naïve implementations. Illustrations 900 and 910 show RACH failure rates & collision probabilities and paging failure rates & collision probabilities, respectively, when used with different sizes of chunks (or subgroups) to activate 30,000 devices that arrive uniformly over a 10 second period. The purpose of these experiments to observe how the selection of different chunk sizes affects the network performance. Chunk size of 1 corresponds to not doing any grouping and paging the devices individually, and chunk size of 30,000 corresponds to the case when we wait for all the requests to arrive and page them as a single group. Illustration 900 suggests that using smaller chunk sizes reduces RACH failure rates and collision probabilities for both M2M and H2H traffic. However, Illustration 910 suggests that if we use chunk sizes less than 100 (or equivalently, more than 300 chunks) the paging failure rate increases significantly (e.g., almost 80% M2M devices fail to complete the paging process for a chunk size of 10). The high failure is because of the fact that smaller chunk sizes means more paging messages are to be sent to activate all the devices, and all these chunks will be paged in slots determined by a common base group identifier, leading to a large number of collisions. The high volume of paging messages also negatively impact the H2H paging success rate (failure rate increases by almost 18 times when using chunk sizes of 10 as opposed to chunk sizes of 100).

Illustration 920 shows another tradeoff the network considers while selecting the proper chunk sizes. We see that, if we use very large chunk size e.g., 15,000 or moderately small chunk size (e.g., 100-1000), M2M average wait time and overall completion time increases. This is due to the fact that large chunk size leads to more RACH collisions and hence more retransmissions, whereas, smaller chunk sizes leads to more number of chunks (chunk size of 100 means 300 chunks for a group arrival of 30,000), and hence more number of paging messages. The cumulative effect of paging delay (paging message can be sent in only one slot per DRX cycle) and any overestimation of additional RACH delay leads to overall increased wait times and completion times for M2M. As evident from the figure, average wait time for H2H remains mostly unaffected irrespective of the chunk sizes we use because our RACH adaptation methods ensure that the M2M traffic use the RACH in a well distributed manner. Moreover, since all M2M chunks only utilize a single paging slot per DRX cycle, H2H paging traffic do not face much competition from M2M traffics, hence the paging delay also remains unaffected. We omit results for a group arrival of 5000 over 10 s which show similar, but less pronounced, results.

Figure 10A:
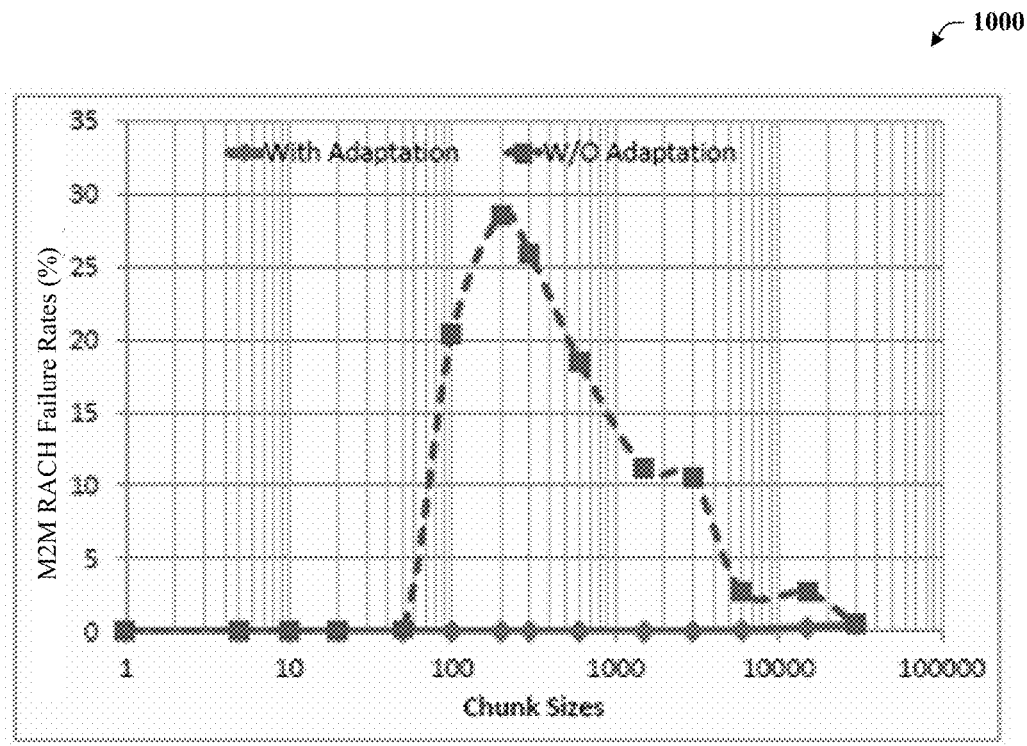
FIG. 10A depicts an example graphical illustration that provides a comparison of RACH failure rates with and without disclosed adaption mechanisms in accordance with certain embodiments of this disclosure.

FIG. 10A depicts illustration 1000. Illustration 1000 provides a comparison of RACH failure rates with and without disclosed adaption mechanisms. Illustration 1000 shows why it is beneficial to adapt the RACH process to ensure that consecutive chunks do not overlap with each other. We ignore chunk sizes less than 100 due to high paging failure rates. For the smaller chunk sizes in the range of [100-5000], the RACH failure rates are very high, almost 30% for chunk sizes of 200, 20% for chunk sizes of 500, etc. This is due to the fact that, without any adaptation, it is likely that one chunk is paged at a time when the other chunk is still accessing the RACH, so RACH access attempts from the devices belonging to the newly arrived chunk (albeit initial random backoff) will collide with access attempts from the previous chunks leading to high RACH failure rate. Furthermore, as a consequence of the paging mechanism, all the chunks that arrive within a paging DRX cycle are paged at the same time. Smaller chunk sizes also increases the number of chunks that arrive within a paging DRX cycle and, hence, the number of chunks that start the RACH procedure at the same instant. We see that, with our adaptation method the RACH failure rate remains close to zero irrespective of the chunk sizes used. Thus, we achieve an order of magnitude improvement as far as RACH failure rates are concerned with our adaptation scheme.

Figure 10B:
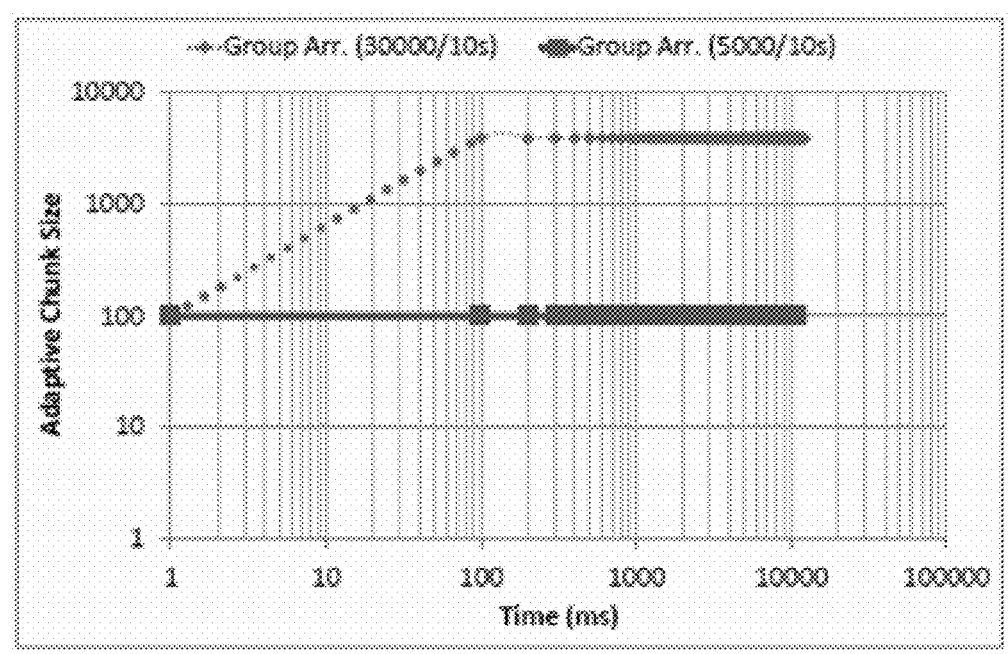
FIG. 10B depicts an example graphical illustration that provides a comparison relative to adaptive chunk sizes in accordance with certain embodiments of this disclosure.

FIG. 10B depicts illustration 1010. Illustration 1010 provides a comparison relative to adaptive chunk sizes. Illustration 1010 shows how our adaptive chunk selection method is able to select optimal operating points for different arrival intensities. Recall, the network initially selects a default minimum chunk size that avoids high paging failures. In our experiment we set the default value to 100. We see that, for group arrivals of 30,000/10 s, the network converges to the optimal chunk size (3840) within only 100 ms of the arrival start time. The access completion time is 12.2 s, whereas the average wait times for M2M and H2H are 1.1 s and 0.32 s, respectively. Also, RACH and Paging failure rates for both M2M and H2H are zero in this case. We note that, these results are consistent with the optimal operating points we observe in our experiment with different (fixed) chunk sizes (e.g., FIGS. 9a, 9b, 9c). For a less intense group arrival of 5000/10 s, the default minimum chunk size proves to be the optimal for the entire simulation period.

Example Methods Associated with Adaptive Group Mechanisms

Figure 11:
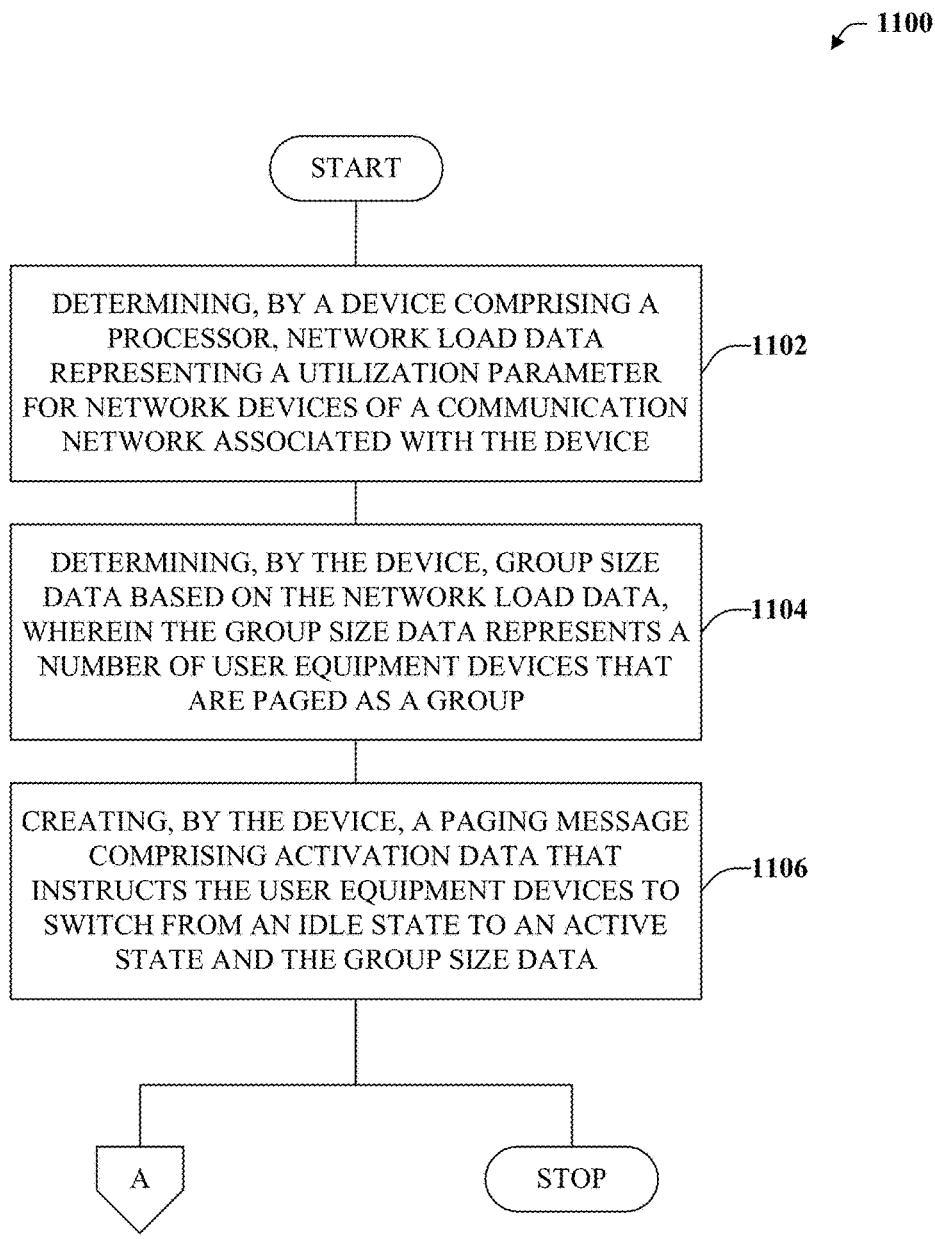
FIG. 11 illustrates an example methodology that can provide for adaptively determining a paging group size in accordance with certain embodiments of this disclosure.
Figure 12:
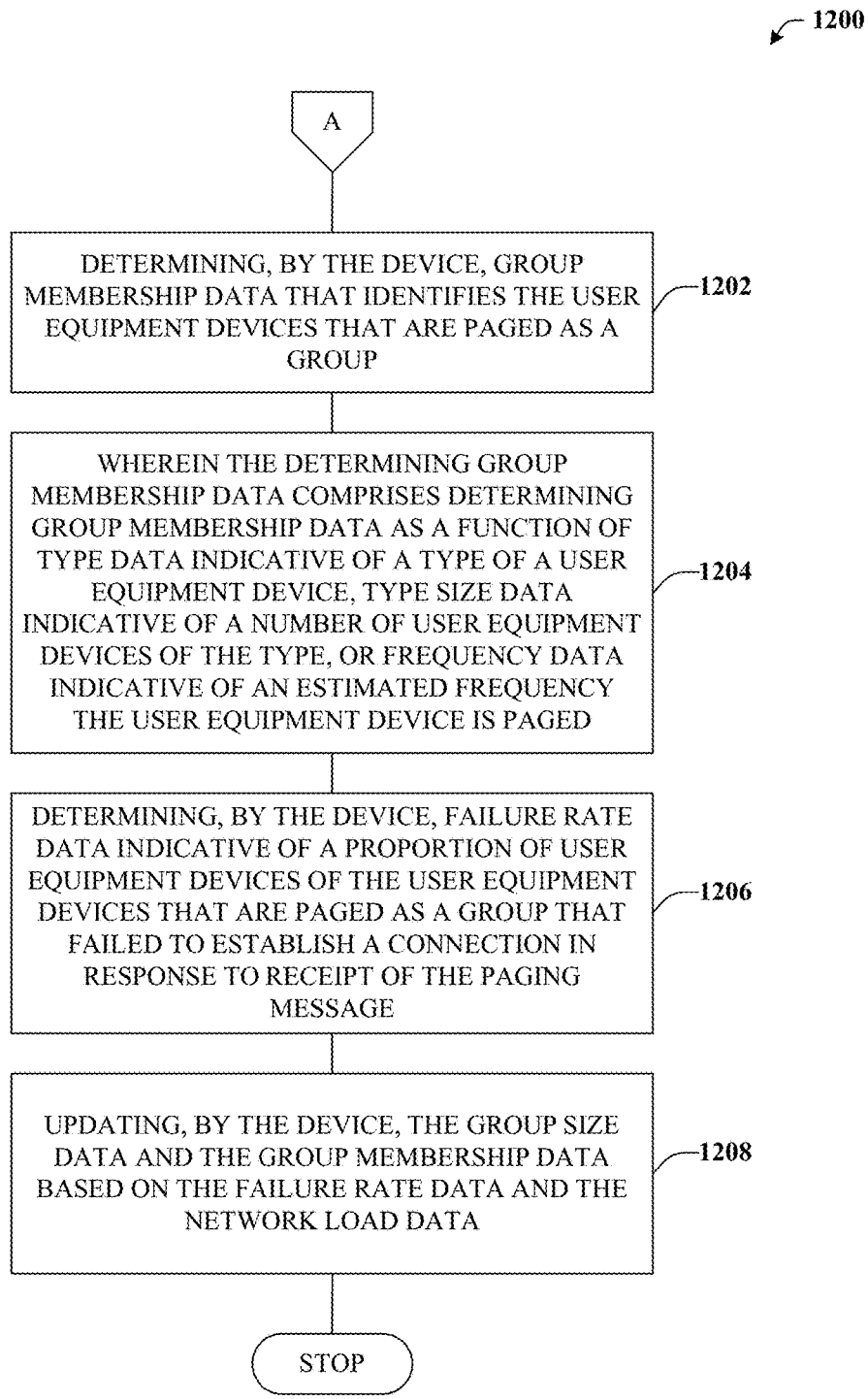
FIG. 12 illustrates an example methodology that can provide for additional elements or aspects in connection with adaptively determining a paging group size in accordance with certain embodiments of this disclosure.

FIGS. 11 and 12 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Turning now to FIG. 11, exemplary method 1100 is depicted. Method 1100 can provide for adaptively determining a paging group size. For example, at reference numeral 1102, a device comprising a processor, can determine network load data representing a utilization parameter for network devices of a communication network associated with the device. In some embodiments the network load data can relate to a load for a control plane resource.

At reference numeral 1104, the device can determine group size data based on the network load data, wherein the group size data represents a number of user equipment devices that are paged as a group. This group size can be determined based in order to reduce failure rates and/or connection times associated with waking the devices as a group.

At reference numeral 1106, the device can create a paging message comprising activation data that instructs the user equipment devices to switch from an idle state to an active state and the group size data. In some embodiments, the paging message can be transmitted to one or more access point devices such as on or more eNBs to facilitate waking up devices served by those eNBs. Method 1100 can proceed to insert A, which is further detailed in connection with FIG. 12, or end.

With reference now to FIG. 12, exemplary method 1200 is illustrated. Method 1200 can provide for additional elements or aspects in connection with adaptively determining a paging group size. For example, at reference numeral 1202, the device can determine group membership data that identifies the user equipment devices that are paged as a group. Hence, the device can determine both a size of a paging group as well as the devices that are to be members of the group.

As described at reference numeral 1204, determining group membership data can be performed as a function of type data indicative of a type of a user equipment device, type size data indicative of a number of user equipment devices of the type, frequency data indicative of an estimated frequency the user equipment device is paged, or based on other suitable parameters.

At reference numeral 1206, the device can determine failure rate data indicative of a proportion of user equipment devices of the user equipment devices that are paged as a group that failed to establish a connection in response to receipt of the paging message. In some embodiments, the device can further determine completion time data representing a time for a group of RACH procedures to complete. In some embodiments, completion time data can be included in failure rate data.

At reference numeral 1208, the device can update the group size data and the group membership data based on the failure rate data and the network load data. It is appreciated that completion rate data can be employed as well to update the groups size data.

Example Operating Environments

Figure 13:
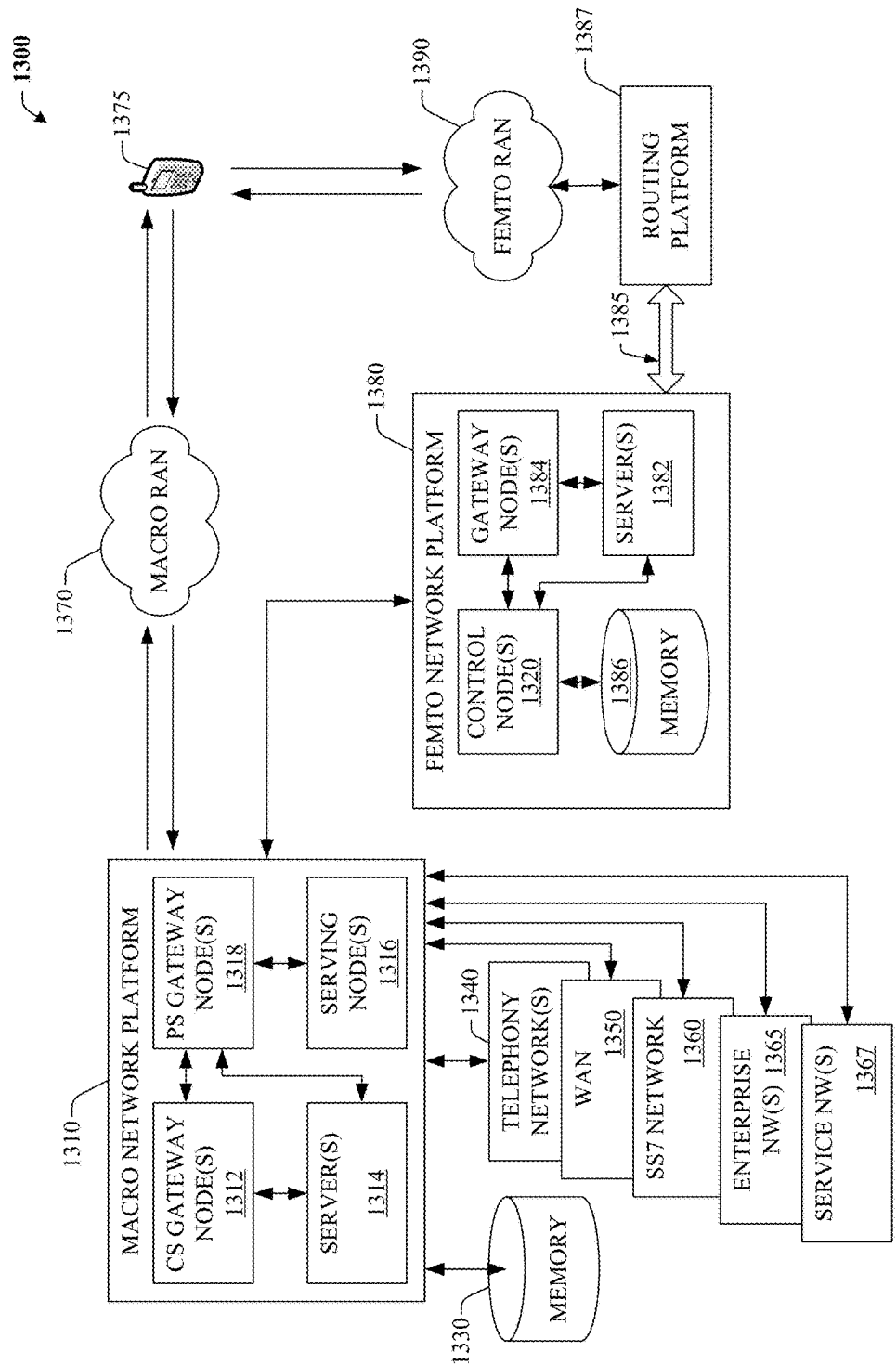
FIG. 13 illustrates a first example of a wireless communications environment with associated components that can be operable to execute certain embodiments of this disclosure.

To provide further context for various aspects of the subject specification, FIG. 13 illustrates an example wireless communication environment 1300, with associated components that can enable operation of a femtocell enterprise network in accordance with aspects described herein. Wireless communication environment 1300 comprises two wireless network platforms: (i) A macro network platform 1310 that serves, or facilitates communication) with user equipment 1375 via a macro radio access network (RAN) 1370. It should be appreciated that in cellular wireless technologies (e.g., 4G, 3GPP UMTS, HSPA, 3GPP LTE, 3GPP UMB, 5G), macro network platform 1310 is embodied in a Core Network. (ii) A femto network platform 1380, which can provide communication with UE 1375 through a femto RAN 1390, linked to the femto network platform 1380 through a routing platform 1310 via backhaul pipe(s) 1385. It should be appreciated that femto network platform 1380 typically offloads UE 1375 from macro network, once UE 1375 attaches (e.g., through macro-to-femto handover, or via a scan of channel resources in idle mode) to femto RAN.

It is noted that RAN comprises base station(s), or access point(s), and its associated electronic circuitry and deployment site(s), in addition to a wireless radio link operated in accordance with the base station(s). Accordingly, macro RAN 1370 can comprise various coverage cells, while femto RAN 1390 can comprise multiple femto access points or multiple metro cell access points. As mentioned above, it is to be appreciated that deployment density in femto RAN 1390 can be substantially higher than in macro RAN 1370.

Generally, both macro and femto network platforms 1310 and 1380 comprise components, e.g., nodes, gateways, interfaces, servers, or platforms, that facilitate both packet-switched (PS) (e.g., internet protocol (IP), Ethernet, frame relay, asynchronous transfer mode (ATM)) and circuit-switched (CS) traffic (e.g., voice and data) and control generation for networked wireless communication. In an aspect of the subject innovation, macro network platform 1310 comprises CS gateway node(s) 1312 which can interface CS traffic received from legacy networks like telephony network(s) 1340 (e.g., public switched telephone network (PSTN), or public land mobile network (PLMN)) or a SS7 network 1360. Circuit switched gateway 1312 can authorize and authenticate traffic (e.g., voice) arising from such networks. Additionally, CS gateway 1312 can access mobility, or roaming, data generated through SS7 network 1360; for instance, mobility data stored in a VLR, which can reside in memory 1330. Moreover, CS gateway node(s) 1312 interfaces CS-based traffic and signaling and gateway node(s) 1318. As an example, in a 3GPP UMTS network, gateway node(s) 1318 can be embodied in gateway GPRS support node(s) (GGSN).

In addition to receiving and processing CS-switched traffic and signaling, gateway node(s) 1318 can authorize and authenticate PS-based data sessions with served (e.g., through macro RAN) wireless devices. Data sessions can comprise traffic exchange with networks external to the macro network platform 1310, like wide area network(s) (WANs) 1350; it should be appreciated that local area network(s) (LANs) can also be interfaced with macro network platform 1310 through gateway node(s) 1318. Gateway node(s) 1318 generates packet data contexts when a data session is established. To that end, in an aspect, gateway node(s) 1318 can comprise a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can comprise multiple flows that can be generated through server(s) 1314. It is to be noted that in 3GPP UMTS network(s), gateway node(s) 1318 (e.g., GGSN) and tunnel interface (e.g., TTG) comprise a packet data gateway (PDG).

Macro network platform 1310 also comprises serving node(s) 1316 that convey the various packetized flows of information or data streams, received through gateway node(s) 1318. As an example, in a 3GPP UMTS network, serving node(s) can be embodied in serving GPRS support node(s) (SGSN).

As indicated above, server(s) 1314 in macro network platform 1310 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can comprise add-on features to standard services provided by macro network platform 1310. Data streams can be conveyed to gateway node(s) 1318 for authorization/authentication and initiation of a data session, and to serving node(s) 1316 for communication thereafter. Server(s) 1314 can also effect security (e.g., implement one or more firewalls) of macro network platform 1310 to ensure network's operation and data integrity in addition to authorization and authentication procedures that CS gateway node(s) 1312 and gateway node(s) 1318 can enact. Moreover, server(s) 1314 can provision services from external network(s), e.g., WAN 1350, or Global Positioning System (GPS) network(s) (not shown). It is to be noted that server(s) 1314 can comprise one or more processor configured to confer at least in part the functionality of macro network platform 1310. To that end, the one or more processor can execute code instructions stored in memory 1330, for example.

In example wireless environment 1300, memory 1330 stores information related to operation of macro network platform 1310. Information can comprise business data associated with subscribers; market plans and strategies, e.g., promotional campaigns, business partnerships; operational data for mobile devices served through macro network platform; service and privacy policies; end-user service logs for law enforcement; and so forth. Memory 1330 can also store information from at least one of telephony network(s) 1340, WAN(s) 1350, or SS7 network 1360, enterprise NW(s) 1365, or service NW(s) 1367.

Femto gateway node(s) 1384 have substantially the same functionality as PS gateway node(s) 1318. Additionally, femto gateway node(s) 1384 can also comprise substantially all functionality of serving node(s) 1316. In an aspect, femto gateway node(s) 1384 facilitates handover resolution, e.g., assessment and execution. Further, control node(s) 1320 can receive handover requests and relay them to a handover component (not shown) via gateway node(s) 1384. According to an aspect, control node(s) 1320 can support RNC capabilities.

Server(s) 1382 have substantially the same functionality as described in connection with server(s) 1314. In an aspect, server(s) 1382 can execute multiple application(s) that provide service (e.g., voice and data) to wireless devices served through femto RAN 1390. Server(s) 1382 can also provide security features to femto network platform. In addition, server(s) 1382 can manage (e.g., schedule, queue, format . . . ) substantially all packetized flows (e.g., IP-based) it generates in addition to data received from macro network platform 1310. It is to be noted that server(s) 1382 can comprise one or more processor configured to confer at least in part the functionality of macro network platform 1310. To that end, the one or more processor can execute code instructions stored in memory 1386, for example.

Memory 1386 can comprise information relevant to operation of the various components of femto network platform 1380. For example operational information that can be stored in memory 1386 can comprise, but is not limited to, subscriber information; contracted services; maintenance and service records; femto cell configuration (e.g., devices served through femto RAN 1390; access control lists, or white lists); service policies and specifications; privacy policies; add-on features; and so forth.

It is noted that femto network platform 1380 and macro network platform 1310 can be functionally connected through one or more reference link(s) or reference interface(s). In addition, femto network platform 1380 can be functionally coupled directly (not illustrated) to one or more of external network(s) 1340, 1350, 1360, 1365 or 1367. Reference link(s) or interface(s) can functionally link at least one of gateway node(s) 1384 or server(s) 1386 to the one or more external networks 1340, 1350, 1360, 1365 or 1367.

Figure 14:
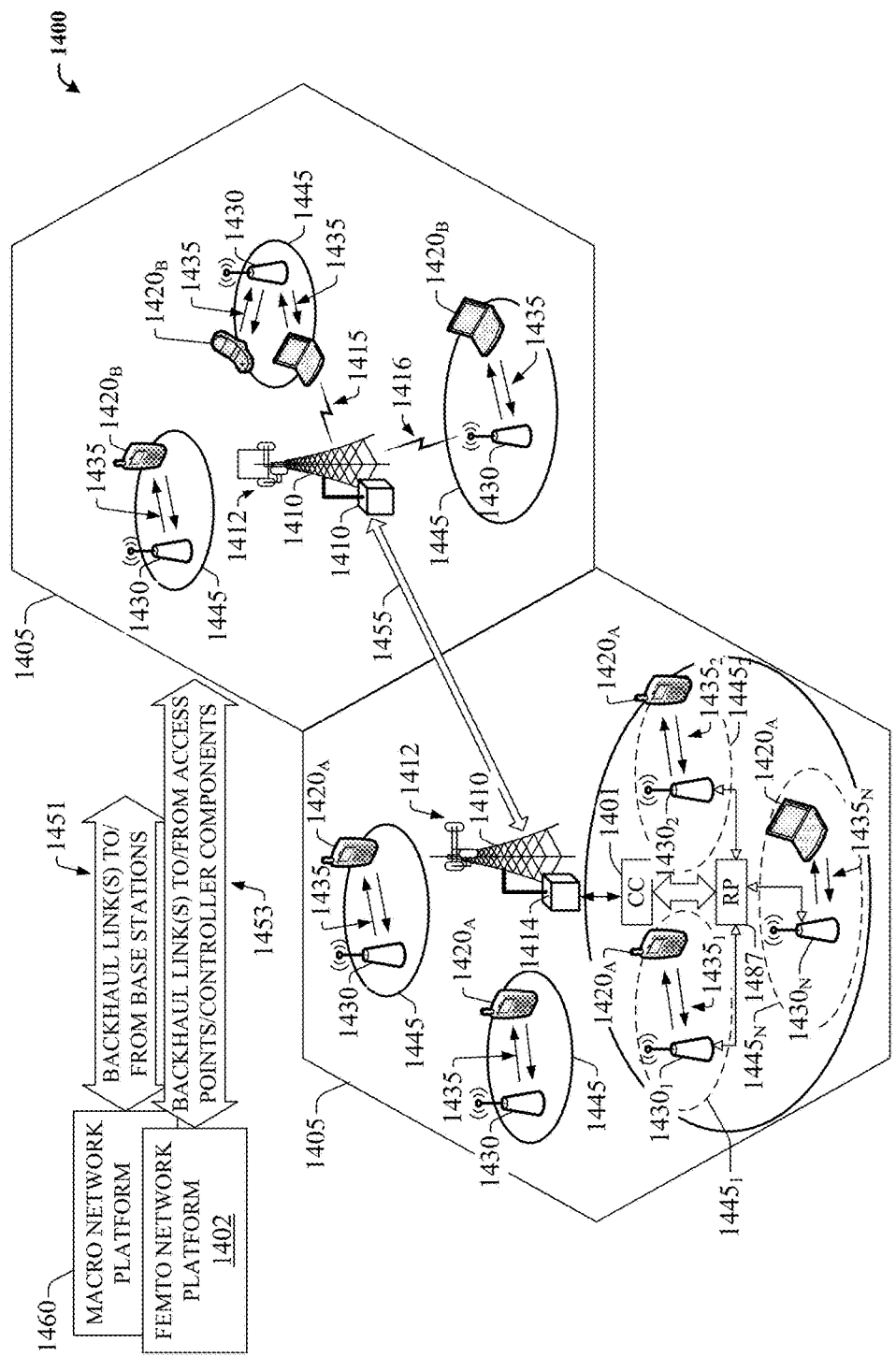
FIG. 14 illustrates a second example of a wireless communications environment with associated components that can be operable to execute certain embodiments of this disclosure.

FIG. 14 illustrates a wireless environment that comprises macro cells and femtocells for wireless coverage in accordance with aspects described herein. In wireless environment 1405, two areas represent "macro" cell coverage; each macro cell is served by a base station 1410. It can be appreciated that macro cell coverage area 1405 and base station 1410 can comprise functionality, as more fully described herein, for example, with regard to system 1400. Macro coverage is generally intended to serve mobile wireless devices, like UE $1420_A$, $1420_B$, in outdoors locations. An over-the-air (OTA) wireless link 1435 provides such coverage, the wireless link 1435 comprises a downlink (DL) and an uplink (UL), and utilizes a predetermined band, licensed or unlicensed, of the radio frequency (RF) spectrum. As an example, UE $1420_A$, $1420_E$ can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 1410 communicates via backhaul link(s) 1451 with a macro network platform 1460, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 1460 controls a set of base stations 1410 that serve either respective cells or a number of sectors within such cells. Base station 1410 comprises radio equipment 1414 for operation in one or more radio technologies, and a set of antennas 1412 (e.g., smart antennas, microwave antennas, satellite dish(es) . . . ) that can serve one or more sectors within a macro cell 1405. It is noted that a set of radio network control node(s), which can be a part of macro network platform 1460; a set of base stations (e.g., Node B 1410) that serve a set of macro cells 1405; electronics, circuitry or components associated with the base stations in the set of base stations; a set of respective OTA wireless links (e.g., links 1415 or 1416) operated in accordance to a radio technology through the base stations; and backhaul link(s) 1455 and 1451 form a macro radio access network (RAN). Macro network platform 1460 also communicates with other base stations (not shown) that serve other cells (not shown). Backhaul link(s) 1451 or 1453 can comprise a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., line-of-sight (LOS) or non-LOS) backbone link. Backhaul pipe(s) 1455 link disparate base stations 1410. According to an aspect, backhaul link 1453 can connect multiple femto access points 1430 and/or controller components (CC) 1401 to the femto network platform 1402. In one example, multiple femto APs can be connected to a routing platform (RP) 1487, which in turn can be connect to a controller component (CC) 1401. Typically, the information from UEs $1420_A$ can be routed by the RP 1487, for example, internally, to another UE $1420_A$ connected to a disparate femto AP connected to the RP 1487, or, externally, to the femto network platform 1402 via the CC 1401, as discussed in detail supra.

In wireless environment 1405, within one or more macro cell(s) 1405, a set of femtocells 1445 served by respective femto access points (APs) 1430 can be deployed. It can be appreciated that, aspects of the subject innovation can be geared to femtocell deployments with substantive femto AP density, e.g., $14^4$-$10^7$ femto APs 1430 per base station 1410. According to an aspect, a set of femto access points $\mathbf{1430_1}$-$\mathbf{1430_N}$, with N a natural number, can be functionally connected to a routing platform 1487, which can be functionally coupled to a controller component 1401. The controller component 1401 can be operationally linked to the femto network platform 1402 by employing backhaul link(s) 1453. Accordingly, UE $\mathbf{1420_A}$ connected to femto APs $\mathbf{1430_1}$-$\mathbf{1430_N}$ can communicate internally within the femto enterprise via the routing platform (RP) 1487 and/or can also communicate with the femto network platform 1402 via the RP 1487, controller component 1401 and the backhaul link(s) 1453. It can be appreciated that although only one femto enterprise is depicted in FIG. 14, multiple femto enterprise networks can be deployed within a macro cell 1405.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can comprise legacy telecommunication technologies.

With respect to FIG. 14, in example embodiment 1400, base station AP 1410 can receive and transmit signal(s) (e.g., traffic and control signals) from and to wireless devices, access terminals, wireless ports and routers, etc., through a set of antennas $\mathbf{1412_1}$-$\mathbf{1412_N}$. It should be appreciated that while antennas $\mathbf{1412_1}$-$\mathbf{1412_N}$ are a part of communication platform 1425, which comprises electronic components and associated circuitry that provides for processing and manipulating of received signal(s) (e.g., a packet flow) and signal(s) (e.g., a broadcast control channel) to be transmitted. In an aspect, communication platform 1425 comprises a transmitter/receiver (e.g., a transceiver) 1466 that can convert signal(s) from analog format to digital format upon reception, and from digital format to analog format upon transmission. In addition, receiver/transmitter 1466 can divide a single data stream into multiple, parallel data streams, or perform the reciprocal operation. Coupled to transceiver 1466 is a multiplexer/demultiplexer 1467 that facilitates manipulation of signal in time and frequency space. Electronic component 1467 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1467 can scramble and spread information (e.g., codes) according to substantially any code known in the art; e.g., Hadamard-Walsh codes, Baker codes, Kasami codes, polyphase codes, and so on. A modulator/demodulator 1468 is also a part of operational group 1425, and can modulate information according to multiple modulation techniques, such as frequency modulation, amplitude modulation (e.g., M-ary quadrature amplitude modulation (QAM), with M a positive integer), phase-shift keying (PSK), and the like.

Figure 15:
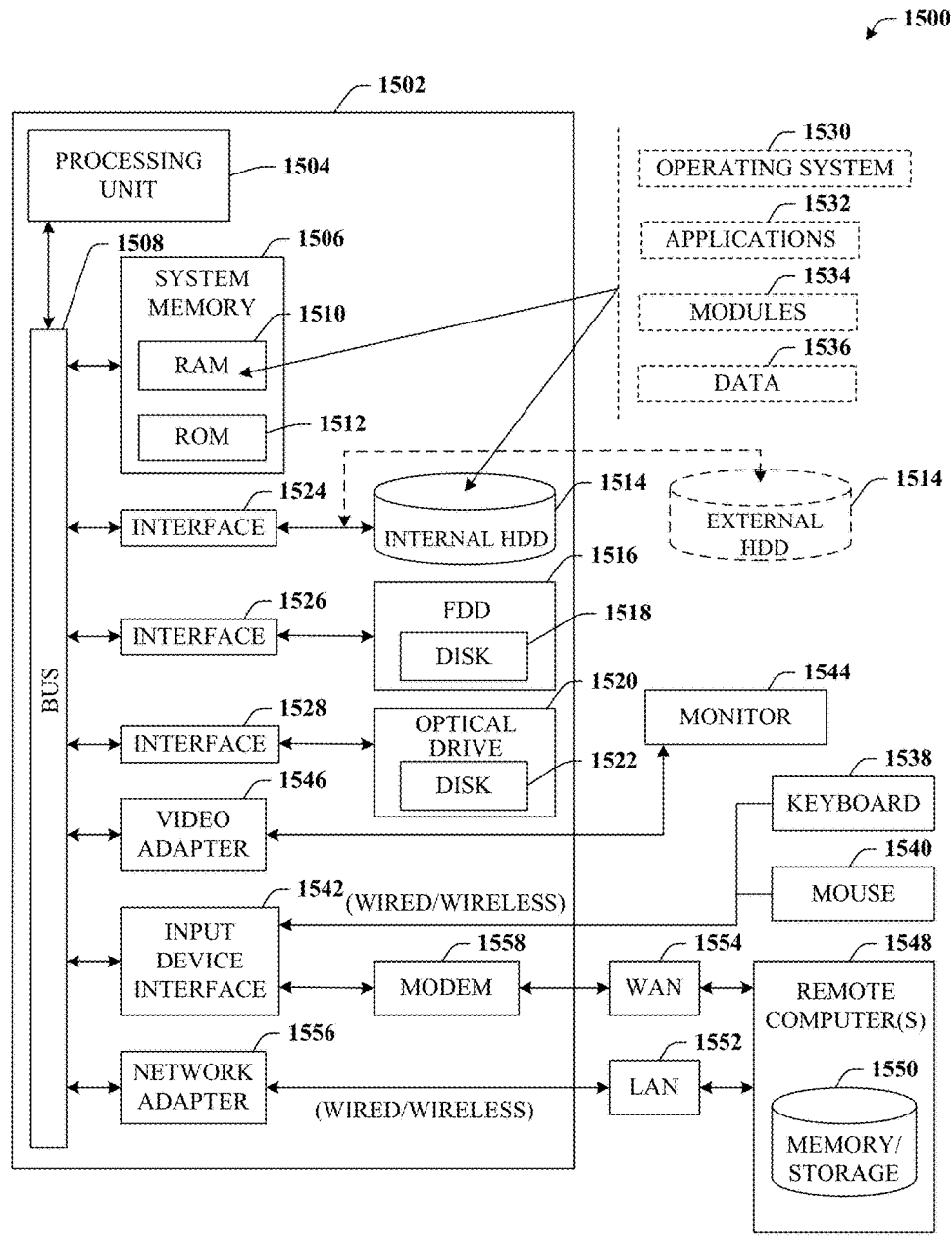
FIG. 15 illustrates an example block diagram of a computer operable to execute certain embodiments of this disclosure.

Referring now to FIG. 15, there is illustrated a block diagram of an exemplary computer system operable to execute the disclosed architecture. In order to provide additional context for various aspects of the disclosed subject matter, FIG. 15 and the following discussion are intended to provide a brief, general description of a suitable computing environment 1500 in which the various aspects of the disclosed subject matter can be implemented. Additionally, while the disclosed subject matter described above may be suitable for application in the general context of computer-executable instructions that may run on one or more computers, those skilled in the art will recognize that the disclosed subject matter also can be implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter may also be practiced in distributed computing environments where certain tasks are performed by remote processing devices that are linked through a communications network. In a distributed computing environment, program modules can be located in both local and remote memory storage devices.

A computer typically comprises a variety of computer-readable media. Computer-readable media can be any available media that can be accessed by the computer and comprises both volatile and nonvolatile media, removable and non-removable media. By way of example, and not limitation, computer-readable media can comprise computer storage media and communication media. Computer storage media can comprise either volatile or nonvolatile, removable and non-removable media implemented in any method or technology for storage of information such as computer-readable instructions, data structures, program modules or other data. Computer storage media comprises, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and comprises any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared and other wireless media. Combinations of the any of the above should also be included within the scope of computer-readable media.

Still referring to FIG. 15, the exemplary environment 1500 for implementing various aspects of the disclosed subject matter comprises a computer 1502, the computer 1502 including a processing unit 1504, a system memory 1506 and a system bus 1508. The system bus 1508 couples to system components including, but not limited to, the system memory 1506 to the processing unit 1504. The processing unit 1504 can be any of various commercially available processors. Dual microprocessors and other multi-processor architectures may also be employed as the processing unit 1504.

The system bus 1508 can be any of several types of bus structure that may further interconnect to a memory bus (with or without a memory controller), a peripheral bus, and a local bus using any of a variety of commercially available bus architectures. The system memory 1506 comprises read-only memory (ROM) 1510 and random access memory (RAM) 1512. A basic input/output system (BIOS) is stored in a non-volatile memory 1510 such as ROM, EPROM, EEPROM, which BIOS contains the basic routines that help to transfer information between elements within the computer 1502, such as during start-up. The RAM 1512 can also comprise a high-speed RAM such as static RAM for caching data.

The computer 1502 further comprises an internal hard disk drive (HDD) 1514 (e.g., EIDE, SATA), which internal hard disk drive 1514 may also be configured for external use in a suitable chassis (not shown), a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations comprises at least one or both of Universal Serial Bus (USB) and IEEE1394 interface technologies. Other external drive connection technologies are within contemplation of the subject matter disclosed herein.

The drives and their associated computer-readable media provide nonvolatile storage of data, data structures, computer-executable instructions, and so forth. For the computer 1502, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed subject matter.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. It is appreciated that the disclosed subject matter can be implemented with various commercially available operating systems or combinations of operating systems.

A user can enter commands and information into the computer 1502 through one or more wired/wireless input devices, e.g., a keyboard 1538 and a pointing device, such as a mouse 1540. Other input devices (not shown) may comprise a microphone, an IR remote control, a joystick, a game pad, a stylus pen, touch screen, or the like. These and other input devices are often connected to the processing unit 1504 through an input device interface 1542 that is coupled to the system bus 1508, but can be connected by other interfaces, such as a parallel port, an IEEE1394 serial port, a game port, a USB port, an IR interface, etc.

A monitor 1544 or other type of display device is also connected to the system bus 1508 via an interface, such as a video adapter 1546. In addition to the monitor 1544, a computer typically comprises other peripheral output devices (not shown), such as speakers, printers, etc.

The computer 1502 may operate in a networked environment using logical connections via wired and/or wireless communications to one or more remote computers, such as a remote computer(s) 1548. The remote computer(s) 1548 can be a workstation, a server computer, a router, a personal computer, a mobile device, portable computer, microprocessor-based entertainment appliance, a peer device or other common network node, and typically comprises many or all of the elements described relative to the computer 1502, although, for purposes of brevity, only a memory/storage device 1550 is illustrated. The logical connections depicted comprise wired/wireless connectivity to a local area network (LAN) 1552 and/or larger networks, e.g., a wide area network (WAN) 1554. Such LAN and WAN networking environments are commonplace in offices and companies, and facilitate enterprise-wide computer networks, such as intranets, all of which may connect to a global communications network, e.g., the Internet.

When used in a LAN networking environment, the computer 1502 is connected to the local network 1552 through a wired and/or wireless communication network interface or adapter 1556. The adapter 1556 may facilitate wired or wireless communication to the LAN 1552, which may also comprise a wireless access point disposed thereon for communicating with the wireless adapter 1556.

When used in a WAN networking environment, the computer 1502 can comprise a modem 1558, or is connected to a communications server on the WAN 1554, or has other means for establishing communications over the WAN 1554, such as by way of the Internet. The modem 1558, which can be internal or external and a wired or wireless device, is connected to the system bus 1508 via the serial port interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11

(a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

What has been described above comprises examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from by a computing device.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments comprises a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

What is claimed is:

1. A device, comprising:
 a processor; and
 a memory that stores executable instructions that, when executed by the processor, facilitate performance of operations, comprising:
  determining network load data representing utilization of a network resource for network devices of a communication network associated with the device;
  generating a paging message data structure comprising a first data structure and a second data structure, wherein the first data structure is associated with activation data that instructs a group of user equipment devices to switch from an idle state to an active state and the second data structure is associated with group size data indicative of a size of the group of user equipment devices;
  determining failure rate data indicative of a proportion of user equipment devices of the group that failed to establish a connection;
  determining the group size data as a function of the network load data and the failure rate data; and
  storing the group size data in the paging message data structure.

2. The device of claim 1, wherein the device is a mobility management entity device associated with the communication network that manages idle mode paging of the group of user equipment devices.

3. The device of claim 1, wherein the network load data represents utilization of a control plane resource associated with the communication network.

4. The device of claim 1, wherein the operations further comprise determining membership of the group of user equipment devices based on defined characteristic data associated with potential members of the group.

5. The device of claim 4, wherein the defined characteristic data comprises at least one of: type data indicative of a type of a user equipment device, type size data indicative of a number of user equipment devices of the type in the group, an indication of location of the user equipment device, or frequency data indicative of an estimated frequency the user equipment device is paged.

6. The device of claim 1, wherein the operations further comprise transmitting the paging message data structure to an evolved Node B device that is identified by a tracking area data structure associated with a user equipment device of the group of user equipment devices.

7. The device of claim 6, wherein the operations further comprise receiving from the evolved Node B device connection setup requests associated with the group of user equipment devices and determining the failure rate data in response to the transmitting the paging message data structure.

8. The device of claim 7, wherein the determining the group size data as a function of the failure rate data is determined to reduce the proportion of the user equipment devices of the group that failed to establish the connection.

9. A device, comprising:
a processor; and
a memory that stores executable instructions that, when executed by the processor, facilitate performance of operations, comprising:
receiving a paging message data structure comprising a first data structure and a second data structure, wherein the first data structure comprises activation data that instructs a group of user equipment devices to switch from an idle state to an active state and the second data structure comprises group size data indicative of a size of the group of user equipment devices;
determining capacity data indicative of a first number of user equipment device connections supported by the device;
determining random access channel backoff data as a function of a ratio of the group size data and the capacity data;
updating the random access channel backoff data as a function of random access channel completion rates of random access channel procedures performed by the group of user equipment devices; and
facilitating transmission of a paging message comprising the activation data and the random access channel backoff data to the group of user equipment devices.

10. The device of claim 9, wherein the device is an evolved Node B device associated with the communication network that operates as an access point device for the group of user equipment devices.

11. The device of claim 9, wherein the determining the capacity data comprises determining the capacity data as a function of a second number of user equipment device connections that exist for the device.

12. The device of claim 9, wherein the random access channel backoff data represents a time window during which user equipment devices of the group are to initiate a random access channel procedure to attach to the device.

13. The device of claim 12, wherein the random access channel backoff data comprises an instruction for the user equipment devices of the group to delay initiation of the random access channel procedure by a random amount of time that ranges from zero to a maximum value of the time window.

14. The device of claim 9, wherein the operations further comprise determining a non-overlap delay parameter as a function of random access channel completion times associated with random access channel procedures by the group of user equipment devices.

15. The device of claim 9, wherein the operations further comprise updating time window data indicative of temporal bounds of a delay described by the random access channel backoff data as a function of the capacity data.

16. A method, comprising:
determining, by a device comprising a processor, network load data representing a utilization parameter for network devices of a communication network associated with the device;
determining, by the device, failure rate data indicative of a proportion of user equipment devices of that are paged together as a group that failed to establish a connection;
determining, by the device, group size data based on the network load data and the failure rate data, wherein the group size data represents a first number of user equipment devices that are paged as the group; and
creating, by the device, a paging message comprising activation data that instructs the user equipment devices to switch from an idle state to an active state and the group size data.

17. The method of claim 16, further comprising determining, by the device, group membership data that identifies the user equipment devices that are paged as the group.

18. The method of claim 17, wherein the determining the group membership data comprises determining the group membership data as a function of type data indicative of a type of a user equipment device of the user equipment devices, type size data indicative of number of user equipment devices of the type, or frequency data indicative of an estimated frequency by which the user equipment device is paged.

19. The method of claim 16, further comprising determining, by the device, capacity data indicative of a number of user equipment device connections supported by an access point device.

20. The method of claim 19, further comprising determining, by the device, random access channel backoff data as a function of a ratio of the group size data and the capacity data.

* * * * *